(12) United States Patent
Rostami et al.

(10) Patent No.: US 7,477,885 B2
(45) Date of Patent: Jan. 13, 2009

(54) DC OFFSET CANCELLATION CIRCUITS AND METHODS

(75) Inventors: Edris Rostami, Los Angeles, CA (US); Alireza Mehrnia, Los Angeles, CA (US); Rahim Bagheri, Los Angeles, CA (US); Masoud Djafari, Marina Del Rey, CA (US)

(73) Assignee: Wilinx Corporation, Los Angeles, CA (US)

( * ) Notice: Subject to any disclaimer, the term of this patent is extended or adjusted under 35 U.S.C. 154(b) by 475 days.

(21) Appl. No.: 11/112,174

(22) Filed: Apr. 22, 2005

(65) Prior Publication Data

US 2006/0240779 A1 Oct. 26, 2006

(51) Int. Cl.
*H04B 1/18* (2006.01)

(52) U.S. Cl. .................. 455/284; 455/63.1; 455/266; 455/304; 455/307; 455/309

(58) Field of Classification Search ................ 455/284, 455/63.1, 266, 304, 307, 309
See application file for complete search history.

(56) References Cited

U.S. PATENT DOCUMENTS

| | | | |
|---|---|---|---|
| 5,748,681 A * | 5/1998 | Comino et al. ........... 375/319 |
| 6,449,471 B1 * | 9/2002 | Katsura et al. ........... 455/324 |
| 6,803,867 B1 | 10/2004 | Juang |
| 7,139,542 B2 * | 11/2006 | Vepsalainen et al. ..... 455/266 |
| 2005/0026583 A1 | 2/2005 | Carpineto et al. |
| 2005/0118975 A1 | 6/2005 | Ismail |
| 2006/0068749 A1 * | 3/2006 | Ismail et al. ............. 455/339 |

OTHER PUBLICATIONS

PCT Int'l Search Report, Oct. 26, 2007, WiLinx, Inc.
International Search Report (from a corresponding foreign application), PCT/US06/22294, mailed Oct. 26, 2007.

* cited by examiner

*Primary Examiner*—Sanh D Phu
(74) *Attorney, Agent, or Firm*—Chad R. Walsh; Fountainhead Law Group PC

(57) ABSTRACT

Embodiments of the present invention include circuits and methods for reducing DC Offset. In one embodiment the present invention includes storing DC offset on internal capacitances. In one embodiment, parallel stages are used to remove DC offset corresponding to different local oscillator frequencies. Embodiments of the invention further include changing the low cutoff frequency of the DC cancellation circuits for fast calibration. In a first state, a high pass filter may have a first low cutoff frequency, and in a second state the high pass filter may have a second cutoff frequency lower than the first low cutoff frequency. The present invention also includes a variable gain amplifier with reduced DC offset.

16 Claims, 16 Drawing Sheets

1800A

1800B

DC OFFSET CANCELLATION CIRCUITS AND METHODS

BACKGROUND

The present invention relates to reducing the effects of DC offset in electronic systems, and in particular, to circuits and methods that may be used to reduce DC offset in an electronic system such as a wireless receiver.

Electronic systems often include many different components that operate using voltages and currents, which are typically characterized according to whether or not they change periodically over time. Voltages and currents that do not change periodically over time are referred to as "direct current" ("DC") signals, and voltages and currents that do change periodically over time are referred to as "alternating current" ("AC") signals. FIG. 1 illustrates an AC signal, a DC signal and DC offset. FIG. 1 shows three waveforms. Waveform 101 is a purely AC waveform because the voltage, V1, varies periodically (in this case, sinusoidally) over time and is centered on zero volts. Waveform 102 is a purely DC waveform because it maintains the same voltage, V2, over time. Waveform 103 illustrates an AC waveform with a DC offset. Waveform 103 varies with time, but it is shifted to a voltage V3. In this case, waveform 103 is a sinusoid that is offset by a voltage V3. FIG. 2 illustrates the frequency spectrum of an AC waveform with a DC offset such as waveform 103. For instance, waveform 103 may be a sinusoidal signal oscillating at a frequency of f1. Therefore, as shown in FIG. 2, waveform 103 will have a frequency component at f1 and another component at zero frequency (i.e., DC).

In many electronic systems it is desirable to process only the AC components of signals and not the DC component. FIG. 3 illustrates an amplifier circuit that processes both the AC and DC components of a signal. Amplifier 300 may receive a varying voltage Vin as an input and generate an output Vout that is an amplified version of the input. In this example, Vin is a sinusoidal signal with a peak-to-peak amplitude of 400 mV and a DC offset of 1 volt. If amplifier 300 provides a gain of 10, the output Vout will be a sinusoidal signal having a peak-to-peak amplitude of 4 volts and a DC offset of 10 volts.

FIG. 4 illustrates one of the problems caused by DC offsets in an electronic circuit. Non-ideal amplifiers require a power supply Vdd and often include some inherent DC offset. For example, amplifier 400 is powered by a 12 volt supply and has an input referred DC offset of 150 mV, which will increase the DC offset of an input signal Vin by 1.5 volts if amplifier 400 has a gain of 10. Thus, if amplifier 400 receives a sinusoidal signal with a peak-to-peak amplitude of 400 mV and a DC offset of 1 volt, the output should be a sinusoidal signal with a peak-to-peak amplitude of 4 volts and a DC offset of 11.5 volts. However, since the power supply Vdd of amplifier 400 is only 12 volts, the output signal cannot swing to its maximum value of 13.5 volts (i.e., 11.5 v+2v) because the amplifier output is limited to a maximum value of Vdd (often less). Consequently, the output signal will reach a maximum value of 12 volts, which is referred to as "clipping." Thus, the DC offset introduced by amplifier 400 can result in severe distortion of the AC component of the signal. This is just one of many problems caused by unwanted DC offsets.

FIGS. 5A-B illustrate problems caused by DC offset in an analog-to-digital converter. In this example, amplifier 510 receives an input signal Vin and provides an analog output signal Vout to the input of analog-to-digital converter ("ADC") 520. ADC 520 converts the analog signal into binary (i.e., digital) values carried by N digital signal lines (i.e., where N is an integer). Both amplifier 510 and ADC 520 may, but not necessarily, be powered by the same supply Vdd. To optimize the conversion of the analog signal, it is desirable to use the full range of the ADC. When the full range is used, more bits are available to represent the analog input signal values. However, when the full range is not used, fewer bits are available to represent the analog signal values, and the digital representation of the signal is less accurate. The range of the ADC is optimized by making Vout as close to the full range of the ADC as possible (the full range of an ADC is typically, but not necessarily, a little less than Vdd).

FIG. 5B illustrates two signals 501 and 502. Signal 501 is a sinusoidal signal with a DC offset of one-half Vdd ("half-supply"). If the full range of the ADC is from zero volts to Vdd, then signal 501 may be accurately converted because signal 501 varies substantially across the full range, which in this case is an equal amount both above and below half-supply. However, as illustrated by signal 502, when an unwanted DC offset is introduced in a signal, the signal cannot use the full range of the ADC. For instance, signal 502 is a sinusoidal signal with a DC offset of three-fourths Vdd (i.e., 3Vdd/4). Therefore, signal 502 is limited to a maximum amplitude of one-fourth Vdd. Consequently, half the range of the ADC is lost because of the DC offset.

DC offsets are caused by a variety of phenomena. One source of DC offset is from second order harmonics generated by components of an electronic system. For example, if a transistor receives a sinusoidal input signal Vin (e.g., on a gate terminal), the output signal Vout (e.g., on a drain terminal) will typically include some harmonic distortion. The following equations represent the output of an electronic component as a series to illustrate DC offset generated by harmonic distortion:

$$Vout = AVin + BVin^2 + CVin^3 + \ldots$$

If the input, Vin, is a sinusoidal signal having a frequency $\omega_c$, then:

$$Vout = A\sin(\omega_c t) + B\sin^2(\omega_c t) + C\sin^3(\omega_c t) + \ldots$$

Referring to the second term above, which is the second harmonic, the DC offset can be seen as follows:

$$B\sin^2(\omega_c t) = B[\tfrac{1}{2} - \cos(2\omega_c t)/2]$$

It can be seen that the second harmonic introduces a DC component of B/2. Thus, second order harmonic is one source of DC offset in an electronic system.

Another source of DC offset in electronic systems is mismatch between electronic components. For example, if resistors are mismatched in a differential system, bias currents through the different resistances may produce a constant voltage difference in the system. More generally, mismatches between electronic components in amplifiers, current sources and other electronic circuits may cause the components operate at different DC operating points. These non-ideal operational conditions of the components often result in a DC offset in the system.

DC offset is an important factor in many applications, but it is particularly important in the design and operation of wireless receivers. FIG. 6 illustrates an existing technique for reducing DC offset in a "direct conversion" wireless receiver. Wireless receiver 600 includes an antenna 610 for receiving RF signals. Antenna 610 is coupled through a switch 601 to a low noise amplifier 611 ("LNA"), mixer 612, filter 614, variable gain amplifier 615 ("VGA") and analog-to-digital converter 616 ("ADC"). LNA 611 is used for amplifying high frequency signals from antenna 610 and must have sufficient bandwidth, gain and noise performance to meet system requirements. The local oscillator signal ("LO") is generated by frequency synthesizer 630. Mixer 612 receives a local oscillator signal ("LO") at the carrier frequency and down converts the input signal. Filter 614 is used to extract the signal of interest from the down converted signal, and VGA 615 provides appropriate gain so that the input to ADC 616 is optimizing the ADC's full range. The output of the reception channel is coupled to baseband processor 620 over N-bit digital signal lines, for example, for decoding and further processing.

DC offset in a wireless receiver may have many sources in addition to the sources described above. For example, one source of DC offset is from unwanted coupling (sometimes referred to as "leakage" or "feedthrough") of the local oscillator ("LO") signal into other parts of the receiver. The LO signal is typically a strong signal, and as such may couple into the communication channel and back into antenna 610. The LO signal may also couple to the input of LNA 611. In both cases the LO signal is boosted by the high gain of the LNA and, consequently, received by mixer 612 on both inputs. This is referred to as "self-mixing." Self-mixing may also occur when the LO signal couples directly to the input of mixer 612. When the LO signal self-mixes with itself, the DC offset voltage generated at the output of mixer 612 may be very large. For instance, when the LO signal is received on both inputs of mixer 612, the LO signal is multiplied by itself. The DC offset generated by this phenomena can be seen from the following equations wherein the LO signal is modeled as a sinusoidal signal having a frequency $\omega_c$:

$$\text{Vout mixer} = Vin1 * Vin2$$

$$\text{Vout mixer} = \text{Sin}(\omega_c t)\text{Sin}(\omega_c t); \text{ self-mixing}$$

$$= \text{Sin}^2(\omega_c t)$$

$$= [1 - \text{Cos}(2\omega_c t)]/2$$

$$= \frac{1}{2} - \text{Cos}(2\omega_c t)/2$$

Thus, the mixer output includes a constant component (i.e., ½) that has zero frequency. This term represents a DC offset at the output of the mixer resulting from self-mixing of the LO signal. Similarly, frequency components of the RF input signal may couple from the input channel to the LO input of the mixer. Such components will also self-mix and result in additional DC offset at the mixer output.

DC offset at the output of the mixer in a wireless receiver can have severe consequences on system performance. Typically, wireless receivers are designed to detect very low level signals, and therefore typically have very high gain. VGA 615, for example, may have a gain of 50 dBv or more (i.e., dBv=20 $\log_{10}$(Vout/Vin)), which would increase a DC offset at the mixer output by a factor of over 300. Moreover, in some applications an ADC may have a power supply as low as Vdd=1.2v or less, with a dynamic range on the order of hundreds of millivolts (e.g., 250 mV). Therefore, for accurate conversion of the analog signal, a maximum DC offset of less than a hundred millivolts may be required. This would result in a maximum allowable DC offset at the mixer output of less than a few hundred microvolts. For example, for a maximum allowable offset of 75 mV at the input of the ADC, the maximum DC offset at the output of the mixer would be about 250 µV for a VGA with a gain of 300. While these values are only an example, they clearly illustrate the importance of DC offset cancellation in electronic systems such as a wireless receiver. DC offset cancellation (i.e., DC offset reduction) is thus an important consideration in the design of electronic systems.

FIG. 6 further illustrates one existing approach to removing DC offset from a wireless receiver. According to this approach, the system is calibrated during a calibration cycle using a feedback loop. During the calibration cycle, the ADC measures the DC offset and passes the DC offset value as a digital signal to baseband processor 620. Baseband processor, in turn, provides a DC offset feedback signal to a digital-to-analog converter 621 ("DAC"). The output of the DAC is subtracted off the DC offset in the channel at 622. There are many disadvantages to the DC offset cancellation approach shown in FIG. 6. In particular, feedback loops can be slow, unstable and have limited accuracy. For instance, feedback loops always have some inherent delay around the loop, and some applications may require that the DC offset be eliminated within a period of time that is too short to accommodate such delays. Additionally, as the speed of a closed loop system is increased, such systems tend to become less stable. Moreover, accuracy of existing approaches may be compromised by the limited resolution of the ADC sampling the DC offset, as well as by the accuracy with which the digital system compensates for the DC offset (e.g., if the digital system generates a DC signal to subtract from the DC offset, the accuracy of the DC signal may be limited by the digital-to-analog conversion process). Furthermore, if DC offset varies with gain, calibration would require a different correction for each possible gain setting, which will make the system much more complex.

Thus, there is a need for improved circuits and methods for reducing DC offset, and in particular, for improved circuits and methods that may be used to reduce DC offset in wireless receivers.

SUMMARY

Embodiments of the present invention include circuits and methods for reducing DC offset. In one embodiment the present invention includes storing DC offset on internal capacitances. In one embodiment, parallel stages are used to remove DC offset corresponding to different local oscillator frequencies. Other embodiments of the invention include DC offset cancellation circuits with changing cutoff frequencies that may be used to calibrate DC offsets in a very short period of time. In a first state, a the circuits may have a first cutoff frequency, and in a second state the circuits may have a second cutoff frequency lower than the first cutoff frequency. In another embodiment, the present invention includes a variable gain amplifier circuit including a fixed gain amplifier followed by a DC offset cancellation circuit followed by an attenuator to reduce the effects of DC offset.

In one embodiment, the present invention includes a wireless receiver comprising a mixer having a first input, a second input and an output, wherein the first input is coupled to a first amplifier to receive an amplified RF signal and the second input is coupled to a frequency synthesizer to receive a first signal having one of a plurality of frequencies, and a plurality of parallel DC offset cancellation stages selectively coupled to the mixer output, wherein if the first signal has a first frequency, then a first one of the plurality of parallel DC offset cancellation stages is coupled to the mixer output, and if the first signal has a second frequency, then a second one of the plurality of parallel DC offset cancellation stages is coupled to the mixer output.

In another embodiment, the present invention includes a wireless receiver comprising a first DC offset cancellation circuit, wherein in a first state, the first DC offset cancellation circuit has a first low cutoff frequency, and in a second state, the first DC offset cancellation circuit has a second low cutoff frequency less than the first low cutoff frequency. In one embodiment, the first DC offset cancellation circuit is coupled between a mixer and a variable gain amplifier. In another embodiment, the variable gain amplifier includes at least one second DC offset cancellation circuit, wherein in the first state, the second DC offset cancellation circuit has a third low cutoff frequency greater than the first low cutoff frequency of the first DC offset cancellation circuit, and in the second state, the second DC offset cancellation circuit has a fourth low cutoff frequency less than the third low cutoff frequency.

In yet another embodiment, the present invention includes wireless receiver including a DC offset cancellation circuit, the DC offset cancellation circuit comprising a capacitor having a first terminal coupled to receive an input signal and a second terminal, a first MOS transistor having a first terminal and a second terminal, the first terminal of the MOS transistor being coupled to the second terminal of the capacitor, and a resistance coupled between the second terminal of the first MOS transistor and a reference voltage, wherein, in a first state, the resistance has a first value so that the circuit has a first low cutoff frequency, and in a second state, the resistance has a second value so that the circuit has a second low cutoff frequency less than the first low cutoff frequency.

The following detailed description and accompanying drawings provide a better understanding of the nature and advantages of the present invention.

DETAILED DESCRIPTION

Described herein are techniques for reducing DC offset in electronic systems. In the following description, for purposes of explanation, numerous examples and specific details are set forth in order to provide a thorough understanding of the present invention. In particular, many of the techniques herein are very complex and are advantageously described using specific examples, such as wireless receivers and ultra-wideband ("UWB") wireless receivers, to illustrate certain advantages of various embodiments. Therefore, many of the techniques are described in a wireless receiver application. However, it will be evident to one skilled in the art that embodiments of the present invention may be used in other applications. Thus, the inventions, as defined by the claims, may include some or all of the features in these examples alone or in combination with other features described below.

Figure 1:
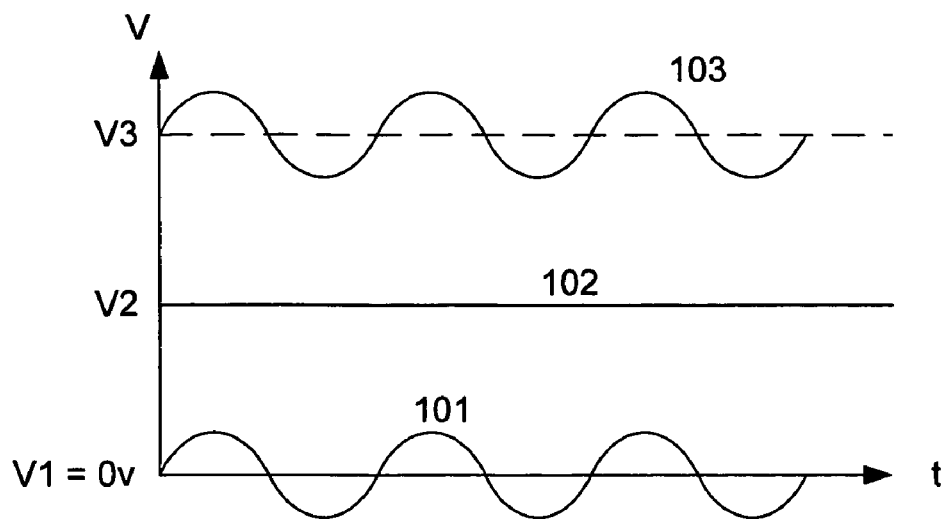
FIG. 1 illustrates an AC signal, a DC signal and DC offset.
Figure 2:
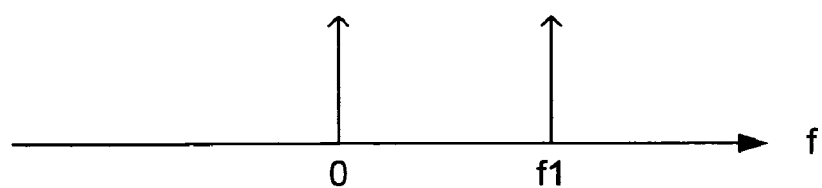
FIG. 2 illustrates the frequency spectrum of an AC waveform with a DC offset.
Figure 3:
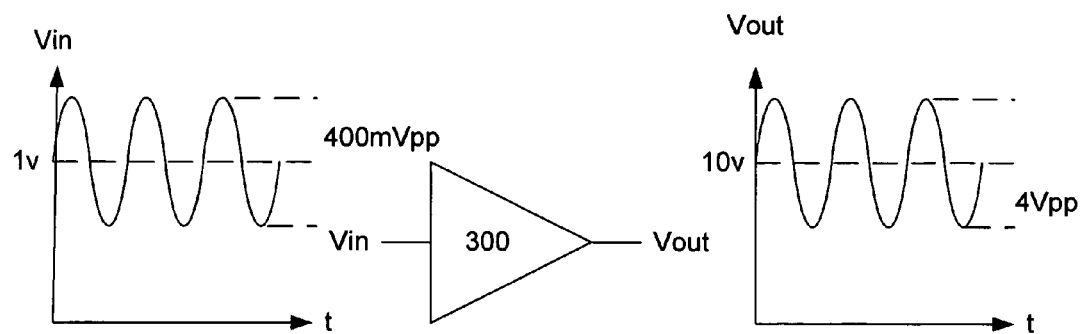
FIG. 3 illustrates an amplifier circuit that processes both the AC and DC components of a signal.
Figure 4:
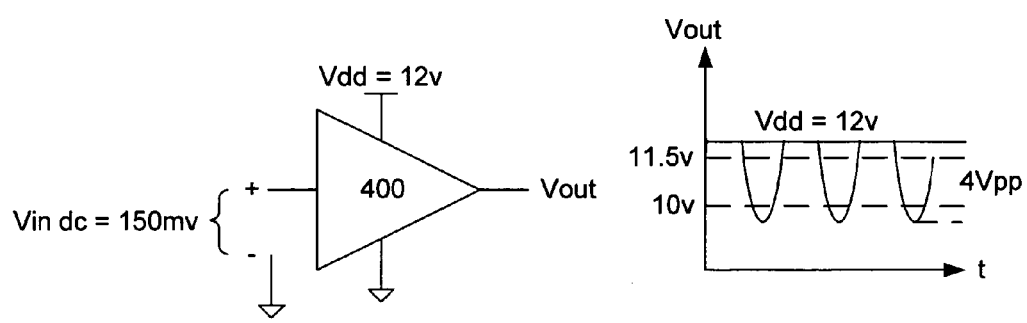
FIG. 4 illustrates one of the problems caused by DC offsets in an electronic circuit.
Figure 5A:
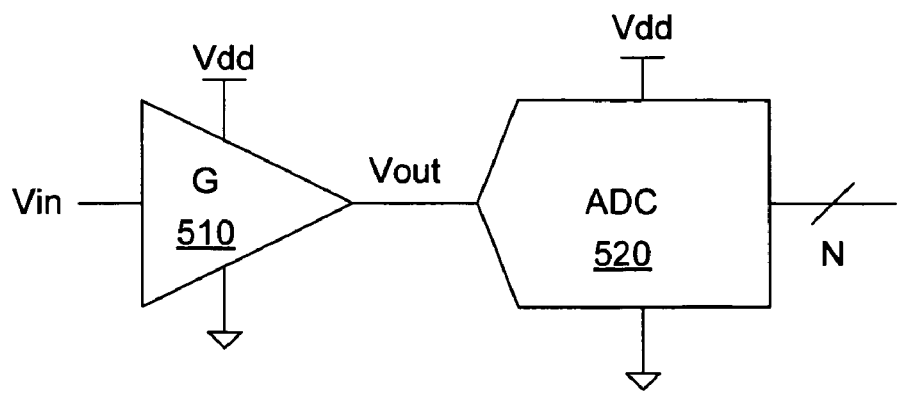
FIGS. 5A-B illustrate problems caused by DC offset in an analog-to-digital converter.
Figure 5B:
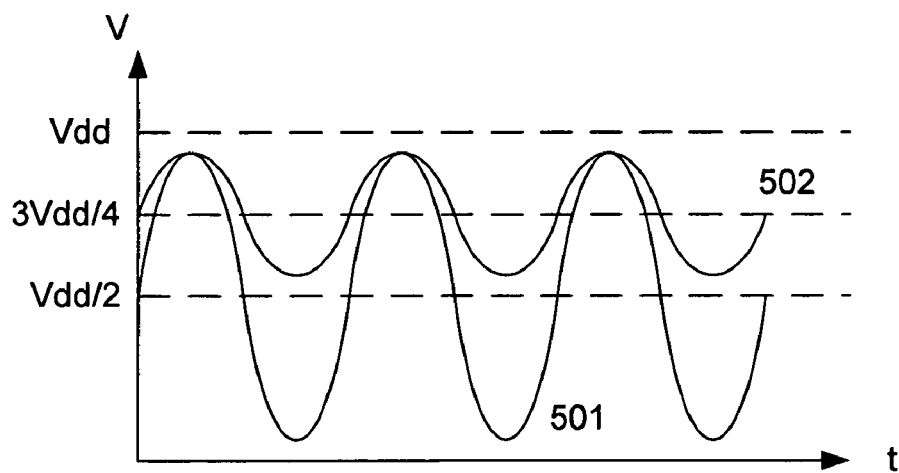
Figure 6:
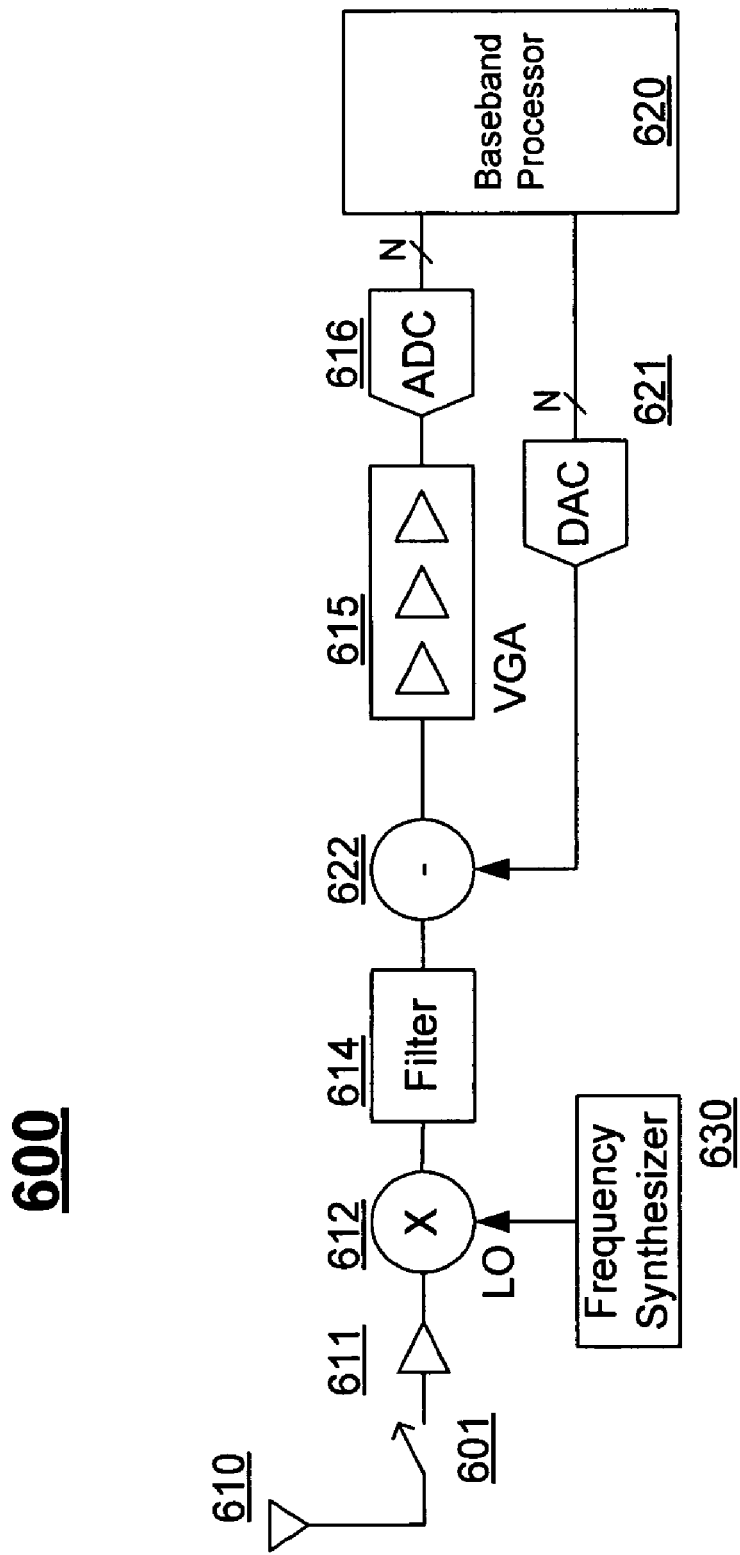
FIG. 6 illustrates an existing technique for reducing DC offset in a direct conversion wireless receiver.
Figure 7:
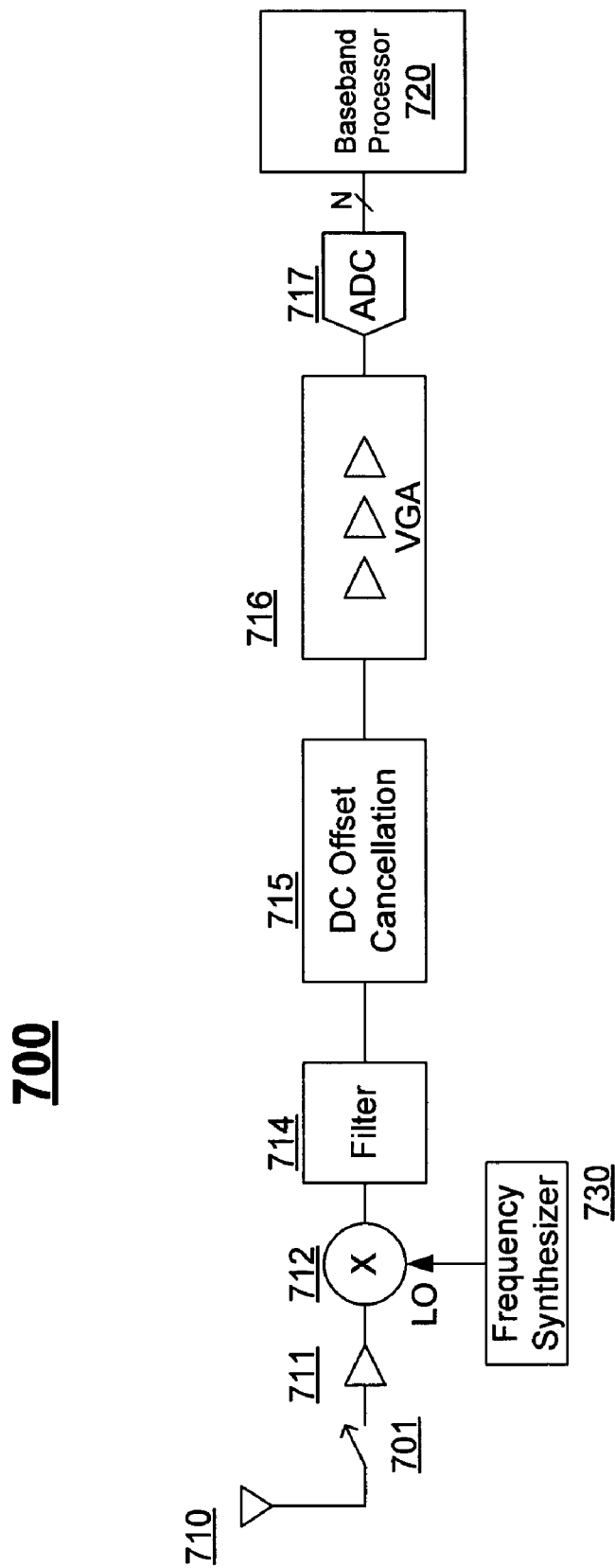
FIG. 7 illustrates a wireless receiver including DC offset cancellation according to one embodiment of the present invention.

FIG. 7 illustrates a wireless receiver including DC offset cancellation according to one embodiment of the present invention. Wireless receiver 700 includes an antenna 710 for receiving a RF signal. An RF signal received on antenna 710 is coupled through switch 701 to a low noise amplifier 711 ("LNA"). LNA 711 is used for amplifying high frequency signals from antenna 710 and must have sufficient bandwidth, gain and noise performance to meet system requirements. The gain of LNA 711 may be adjustable, for example, between 10 dBv and 20 dBv. The output of LNA 711 is coupled to one input of mixer 712. The reception channel may include two mixers and parallel paths for both in phase and quadrature paths (only one path is shown here). A local oscillator signal ("LO") is generated by frequency synthesizer 730. Mixer 712 receives a local oscillator signal ("LO") at the carrier frequency and down converts the input signal. In this example, the system is a direct conversion system. In a direct conversion system, the input signal is down converted to baseband, and no intermediate frequencies are used. However, the present invention is not limited to direct conversion systems. The output of mixer 712 is coupled to filter 714. Filter 714 is used to extract the signal of interest from the down converted signal. The present invention includes a DC offset cancellation circuit 715 between filter 714 and a VGA 715. The DC offset cancellation circuit reduces the DC offset from upstream circuits (e.g., mixer 712 and LNA 711). VGA 715 receives the down converted signal with reduced DC offset and provides appropriate gain so that the input to ADC 716 is at the ADC's full range. In one embodiment, VGA 715 may be a programmable gain amplifier ("PGA") that receives digital gain control signals from another part of the system to change the gain in discrete steps. As described in more detail below, embodiments of the present invention may include additional DC offset cancellation circuits in VGA 715 for further reducing DC offset in the system. The output of the reception channel is coupled to baseband processor 720 over N-bit digital signal lines, for example, for decoding and further processing.

Figure 8A:
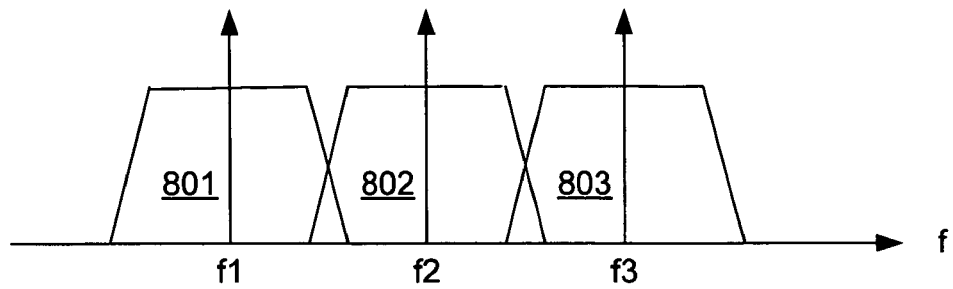
FIGS. 8A-B illustrate another DC offset phenomena addressed by embodiments of the present invention.
Figure 8B:
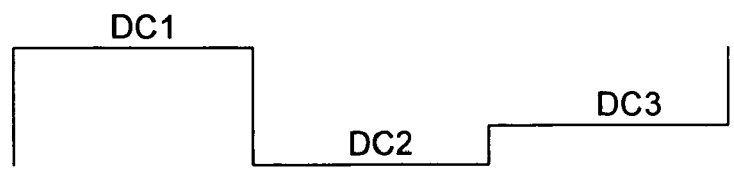
Figure 8B:
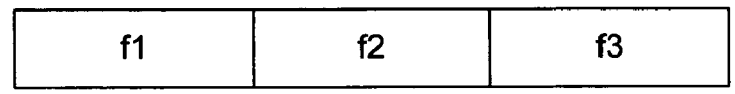

FIGS. 8A-B illustrate another DC offset phenomena addressed by embodiments of the present invention. FIG. 8A illustrates frequency hopping. Some wireless systems may use multiple carrier frequencies that each carry information of interest. FIG. 8A illustrates three carrier frequencies f1, f2, and f3 used to carry information in three communication channels 801, 802, and 803. In a frequency hopping transmission scheme, the channel used to transfer information may change between the three channels 801, 802, and 803 during a single communication event (e.g., communication of a data packet). Thus, the system may receive information on a first carrier frequency, f1, and the synthesizer must generate an LO signal at f1 to down convert the incoming signal. After some time period, the system may change the channel, and the synthesizer must change the frequency of the LO signal to extract the information received on the new channel (e.g., f2 on channel 802). These frequency changes are sometimes referred to as "channel hopping," and such changes between frequencies may occur in a variety of different patterns (e.g., f1-f2-f3-f1-f2-f3 or f1-f3-f2-f1-f3-f2).

One problem caused by frequency hopping is that the different LO signals used to down convert the different carrier frequencies can produce different DC offsets. FIG. 8B illustrates different DC offsets generated at different frequencies f1, f2, and f3. When the system is receiving information on channel 801, and generating an LO signal having a frequency f1, the output of mixer 712 will have a DC offset of "DC1." Similarly, when the system is receiving information on channel 802, and generating an LO signal having a frequency f2, the output of mixer 712 will have a DC offset of "DC2." Finally, when the system is receiving information on channel 803, and generating an LO signal having a frequency f3, the output of mixer 712 will have a DC offset of "DC3."

Figure 9:
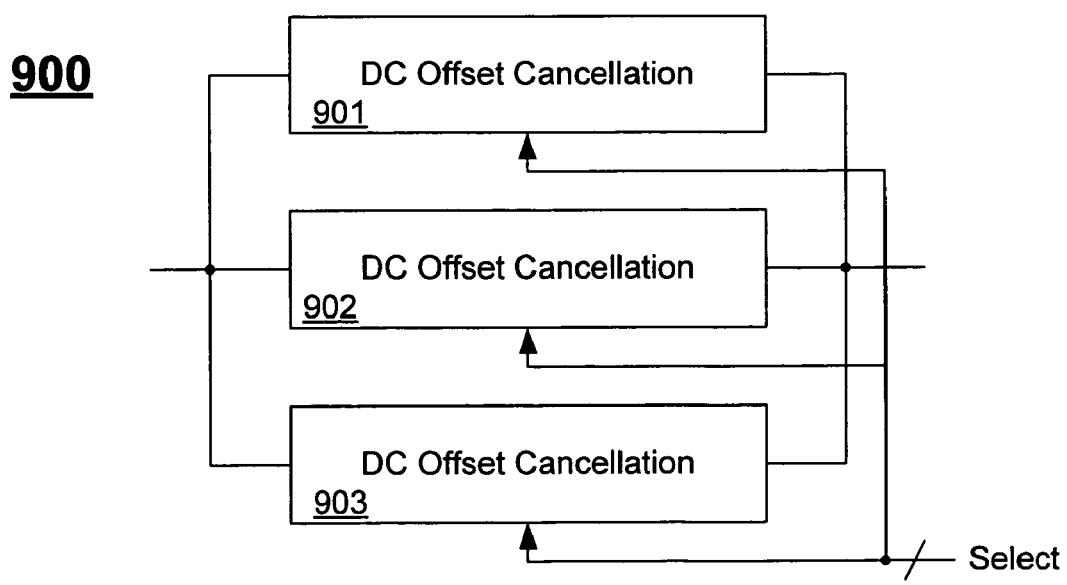
FIG. 9 illustrates a DC offset cancellation circuit according to one embodiment of the present invention.

In one embodiment, the present invention reduces DC offset caused by channel hopping. FIG. 9 illustrates DC offset cancellation according to one embodiment of the present invention. DC offset cancellation circuit 900 includes first, second, and third DC offset cancellation stages 901-903 in parallel and control signals ("Select") for controlling which stage is active. For example, each DC cancellation stage may include an internal capacitance (e.g., a capacitor) for storing different DC offsets corresponding to different LO frequencies. Thus, when a receiver is receiving information on a first carrier frequency (e.g., f1 for channel 801), the system activates DC offset cancellation stage 901 for canceling DC offset corresponding to a first LO frequency. When a receiver is receiving information on a second carrier frequency (e.g., f2 for channel 802), the system may activate DC offset cancellation stage 902 for canceling DC offset corresponding to a second LO frequency. Finally, when the receiver is receiving information on a third carrier frequency (e.g., f3 for channel 803), the system activates DC offset cancellation stage 903 for canceling DC offset corresponding to a third LO frequency. As illustrated below, each stage may be activated by selectively coupling each stage to the mixer output, for example, by closing internal switches in each circuit.

Figure 10A:
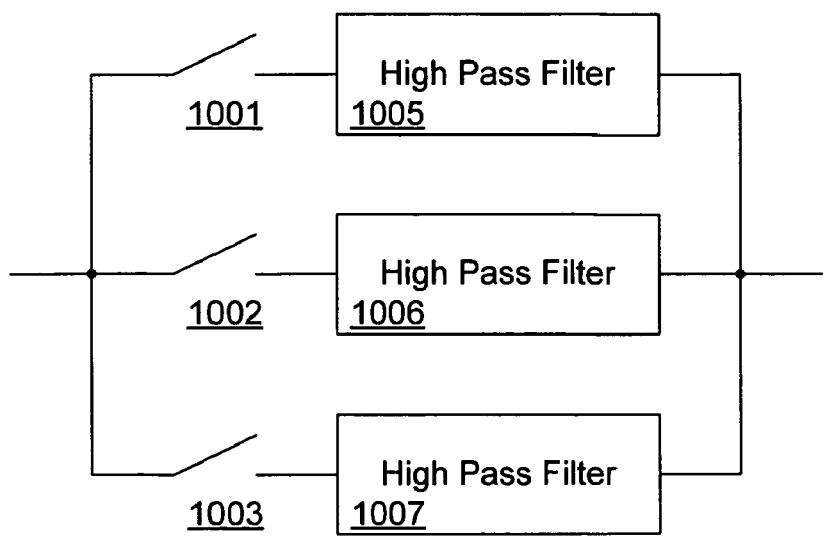
FIGS. 10A-B are example implementations of a DC offset cancellation circuit according to one embodiment of the present invention.
Figure 10B:
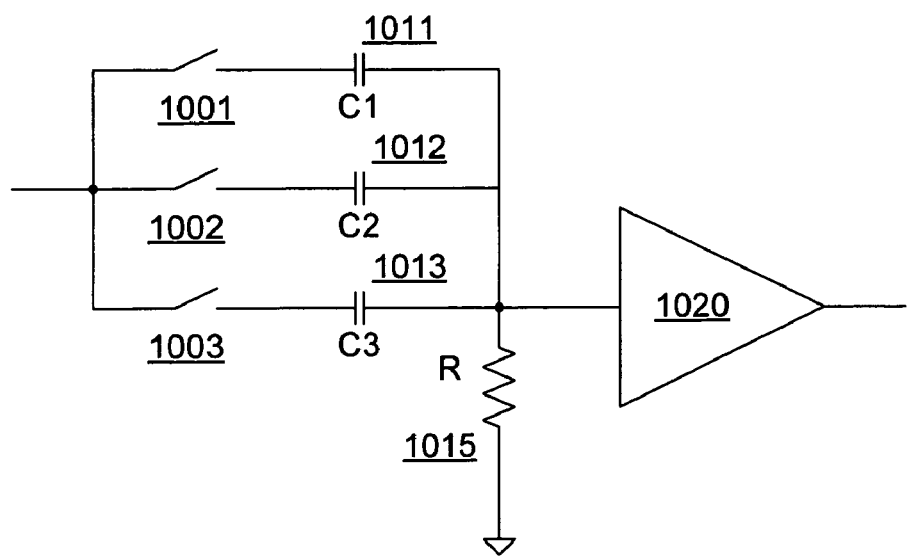

FIGS. 10A-B are example implementations of a DC offset cancellation circuit according to one embodiment of the present invention. In one embodiment, each DC cancellation stage includes a high pass filter. For example, in FIG. 10A three high pass filters are arranged in parallel and selectively coupled to the mixer output. When the system is receiving a signal on a first channel, switch 1001 may be closed so that the input signal passes through high pass filter 1005. When the system is receiving a signal on a second channel, switch 1002 may be closed so that the input signal passes through high pass filter 1006. When the system is receiving a signal on a third channel, switch 1003 may be closed so that the input signal passes through high pass filter 1007.

FIG. 10B is an example of one high pass filter configuration that may be used. The DC offset cancellation circuit in this example includes three switches 1001-1003 in series with three capacitors 1011-1013. Each capacitor is coupled to ground through a resistance 1015 ("R"). It is understood that ground is a reference voltage and other reference voltages may be used. When switch 1001 is closed, the DC offset ("DC1") generated at the mixer output corresponding to a first channel (i.e., a first LO signal frequency) may be stored on capacitor 1011 ("C1"). When the system "hops" to a new frequency and a new DC offset ("DC2") is generated at the mixer output, switch 1001 is opened and switch 1002 is closed. The new DC offset is stored on capacitor 1012 ("C2"). When the system "hops" to a yet another frequency and a third DC offset ("DC3") is generated at the mixer output, switch 1002 is opened and switch 1003 is closed. The third DC offset is stored on capacitor 1013 ("C3"). After each DC offset is stored on capacitors C1-C3, the down converted signals received from the mixer may be passed for further amplification in amplifier 1020, which may be the first stage of a VGA, for example.

Figure 11:
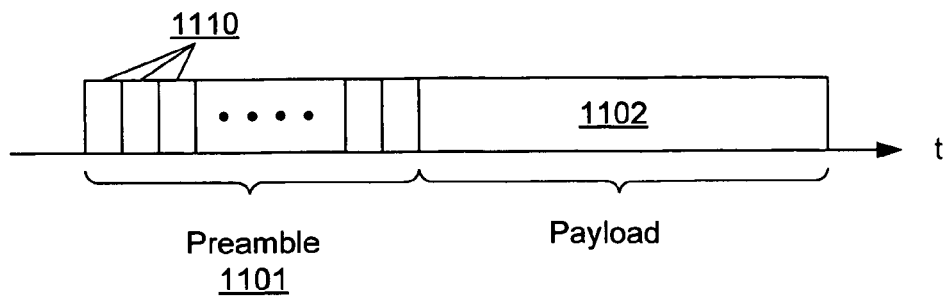
FIG. 11 illustrates another constraint on DC offset cancellation circuits solved by embodiments of the present invention.

FIG. 11 is an example of another constraint on DC offset cancellation circuits solved by embodiments of the present invention. In wireless applications it is often desirable to calibrate DC offset at the beginning of a communication event. If DC offset is calibrated before such an event (i.e., while the system is idle), incoming data may be lost if the data is received while the system in the middle of a calibration cycle. Moreover, calibrated DC levels may need to be periodically refreshed if the system remains idle for an extended period of time. Features and advantages of the present invention include fast calibration of DC offsets at the beginning of a communication event. For example, FIG. 11 shows a preamble 1101 and payload 1102 of an incoming packet in a packet based protocol received by a wireless system at the beginning of a communication. The preamble may be used for synchronization, determining a frequency hopping pattern, and gain adjustment, for example. An example preamble may include 21 symbols 1110 that are each about 310 ns in duration, such as is found in an 802.15 protocol. Each symbol may include a plurality of subcarriers spread across a frequency range, such as orthogonal frequency division multiplexing ("OFDM") signals. Moreover, each symbol may be received on a different frequency channel, and the first symbol may indicate to the receiving system when and how the frequency channels will change (i.e., the first symbol may contain the frequency hopping pattern indicating when the incoming signal will change channels and what the next channel will be). As symbols in the preamble are received, the system may go through a calibration cycle and change the gain of the receiver. However, while the system is receiving the preamble, DC offset should not cause too much signal loss or distortion (e.g., if the receiver becomes saturated) or else the gain adjust and other preamble functions will not be completed accurately. Accordingly, DC offset must be cancelled quickly during reception of the preamble. For instance, some applications may only allocate 10 or 20 percent of each symbol (e.g., about 40-66 ns) for DC offset circuits to complete the DC cancellation process. Moreover, some embodiments may require that the receiver process signals while the DC offset circuits are in the process of calibrating the unwanted DC offsets.

Figure 12A:
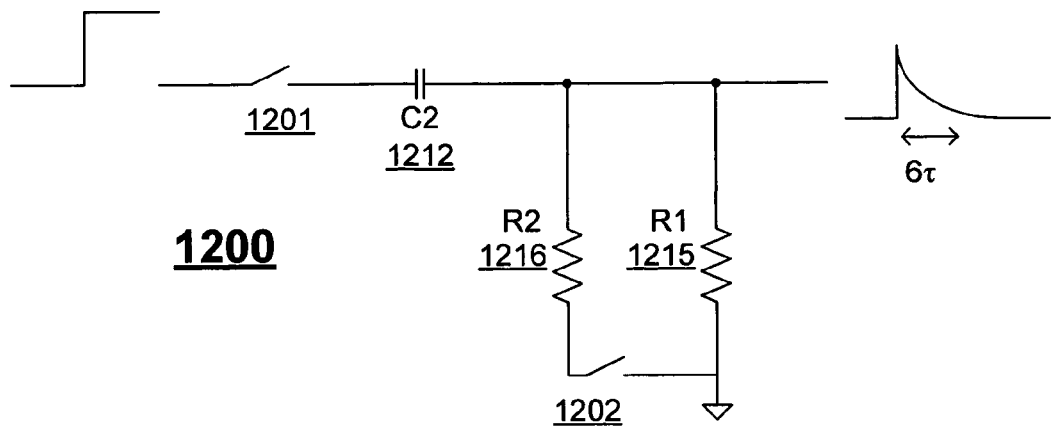
FIGS. 12A-B illustrate a DC offset cancellation circuit according to another embodiment of the present invention.
Figure 12B:
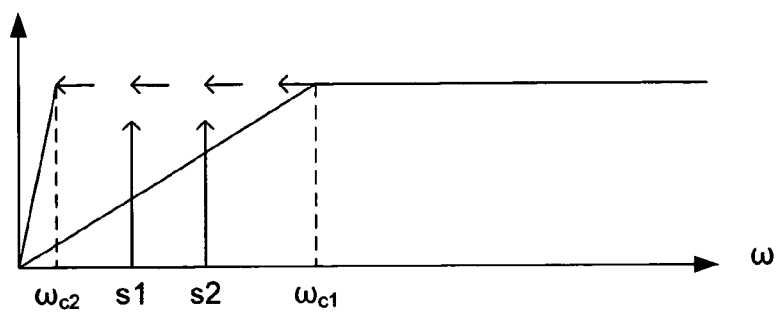

FIGS. 12A-B illustrate a DC offset cancellation circuit according to another embodiment of the present invention. FIG. 12A shows a DC offset correction circuit 1200 that may be used in one channel of the multi-channel circuit of FIG. 9, and includes additional circuitry for DC offset cancellation, for example, when the system is receiving symbols. In one embodiment, the DC offset cancellation circuit operates in two states. In the first state (e.g., a calibration state), the circuit is configured to have a first low cutoff frequency high enough to allow the circuit to accurately capture the DC offset in a short time period. In the second state, the circuit is configured to have a second low cutoff frequency low enough to pass all frequencies of interest. For example, the low cutoff frequency (sometimes referred to as the "corner frequency") of the high pass filter circuit of FIG. 12A is as follows:

$$f_c = 1/2\pi RC$$

$$\omega_c = 1/RC$$

where C is the capacitance of C2 and R is the resistance determined by resistors 1215 ("R1") and 1216 ("R2").

When the system is receiving information on a first frequency channel, the system may close switches 1201 and 1202, thereby placing the circuit in the signal path and further configuriing R1 and R2 in parallel. Since the resistance of a parallel combination of resistors R1 and R2 is less than the resistance of R1 alone, the low cutoff frequency increases when switch 1202 is closed (i.e., R decreases so $f_c$ increases). If DC offset from the mixer causes an increase in the voltage on capacitor 1212 ("C2"), such increase will cause a corresponding increase on the filter output. However, the output of the filter will discharge back to zero volts through resistors R1 and R2. It is desirable to accurately store the DC offset on capacitor C2. Therefore, it is desirable to allow the output to discharge as close to zero volts as possible. The settling time of the circuit is governed by the time constant, $\tau$. If a time period of $6\tau$ passes, for example, the output will be very close to ground, and the DC correction voltage stored on C2 will be very close to the DC offset of the mixer. Since the time constant of the circuit is given by $\tau=RC$, increasing the low cutoff frequency (e.g., by configuring R1 and R2 to be in parallel) has the effect of reducing the time constant, and therefore, reducing the time that is needed to accurately store the DC offset on the capacitor. Thus, during DC offset correction, the low cutoff frequency of the circuit may be increased so that the DC offset is accurately stored on capacitor C2.

However, increasing the low cutoff frequency may also cause a loss of information. As shown in FIG. 12B, some information carrying signals (e.g., s1 and s2) may be below the low cutoff frequency of the circuit during DC offset calibration. Some applications may tolerate the loss of some information carrying signals during the calibration cycle, but require that such signals not be lost during normal operation. Accordingly, after a predetermined time period when the DC offset is stored on capacitor C2, the system may reconfigure the circuit to have a second cutoff frequency low enough to pass all frequencies of interest. For example, in a second state, the system may open switch 1202, thereby increasing R and reducing the low cutoff frequency. As shown in FIG. 12B, the low cutoff frequency moves from $\omega_{c1}$ to $\omega_{c2}$. Thus, all the information carrying signals may pass through the circuit (e.g., s1 and s2 will be above the cutoff frequency in the second state rather than below the cutoff frequency as in the first state). It is to be understood that a variety of low cutoff frequencies may be used to reduce the RC time constant of the circuit or pass signals of interest, and a variety of time periods may be used to accurately capture the DC offset. Such implementation details will be matters of design choice governed by the design requirements of the application.

An example application of this technique is in a wireless receiver that receives 21 symbols in a preamble at the beginning of each communication transaction. In one application, each symbol is 310 ns, and different symbols may be received on different carrier frequencies (i.e., different LO frequencies are used to down convert the incoming RF signal carrying different symbols). For instance, the first symbol may be received on carrier frequency f1, the second symbol may be received on carrier frequency f2 and the third symbol may be received on carrier frequency f3. In some cases, other frequency hopping patterns are used such as [f1, f3, f2, f1, f3, f2] or [f1, f1, f2, f2, f3, f3], for Moreover, each symbol may include a plurality of subcarriers (e.g., s1, s2, ..., sN) spaced at certain frequency intervals (e.g., 4.125 MHz). The subcarriers may carry information, for example, by encoding two data bits {a, b} as follows:

$$s1 = \sin(2\pi f_1 t + \phi)$$

wherein an example of the data encoding is as follows:

$$\{0,0\} \rightarrow \phi = 0$$

$$\{0,1\} \rightarrow \phi = \pi/2$$

$$\{0,0\} \rightarrow \phi = \pi$$

$$\{1,1\} \rightarrow \phi = 3\pi/2$$

During a calibration cycle, this data may be used to configure the system to accurately receive the payload. Thus, during a calibration cycle, the DC offset must be corrected, but in the process of correcting for DC offset, data cannot be lost or else the system will not be able to receive the data encoded in the subcarriers.

For this example, DC offset may be captured on capacitor C2 for a first portion of the symbol (e.g., about the first 20% of the symbol, which is 20% of 310 ns, or about 66 ns). Therefore, when the first symbol is received, the DC offset correction circuit will initially be configured in a first state wherein the time to accurately store the DC offset on the capacitor is less than a predetermined portion of the total symbol time. In particular, switch 1202 may be closed so the resistance to ground is reduced and the time constant of the circuit reduced (i.e., the low cutoff frequency is increased). Resistors R1 and R2 and capacitor C2 may be selected so the time to accurately store the DC offset is less than about 20% of the symbol time (e.g., $6\tau=6RC$).

Additionally, the RC time constant will also set the cutoff frequency of the circuit.

If the RC time constant is too low, the corresponding cutoff frequency will be very high and cause more of the subcarriers to be lost. Therefore, R1, R2 and C2 should be selected so that the RC time constant is low enough to allow sufficiently fast and accurate storage of the DC offset on capacitor C2, but high enough to result in a cutoff frequency that allows as many of the subcarriers to pass as possible. In one embodiment, R1, R2 and C2 are selected so that the cutoff frequency in the first state is about 15 Mhz, which only impacts subcarriers below that frequency, and the $6\tau=6RC$ point is about 66 ns. Thus, after this portion of the symbol time, the system may receive the information in the first symbol above the cutoff frequency. It is to be understood that the cutoff frequency and time constant are only examples and that a variety of other implementations may be used depending on the requirements of the particular system.

After a predetermined time period during which the DC offset is stored on capacitor C2, the system may reconfigure circuit 1200 into a second state by opening switch 1202, and thereby removing R2 from the circuit. In the second state, the DC offset is removed from the signal path because such offset is stored on capacitor C2. However, the cutoff frequency is reduced because R2 is no longer in parallel with R1. Thus, in the second state, the cutoff frequency is below all the subcarriers, and all the subcarriers may pass through circuit 1200. In one embodiment, the cutoff frequency in the second state may be 1 Mhz.

As mentioned above, the first symbol, or even the first two symbols, may be received on a first carrier frequency f1, but the system may change to other carrier frequencies f2 or f3 to carry other symbols. As also described above, this frequency hopping may cause the DC offset to change. Accordingly, the DC offset cancellation process using multiple low cutoff frequencies may be applied to each new carrier frequency received by the system, so that the new DC offset generated from down conversion of a new carrier frequency can be eliminated. For example, if the hopping pattern is [f1, f2, f3, f1, f2, f3 . . . ], then the system will reconfigure itself to receive the second symbol at frequency f2 by deactivating a first DC offset correction circuit and activating a second DC offset correction circuit. For the third symbol, the system will reconfigure itself to receive the third symbol at frequency f3 by deactivating the second DC offset correction circuit and activating a third DC offset correction circuit.

In one embodiment, the system may reconfigure between the first cutoff frequency and the second lower cutoff frequency after all DC offset cancellation circuits have stored DC calibration voltages. For example, in one approach, all of the DC offset cancellation circuits may be configured in the first state until each channel in a frequency hopping pattern has been received and DC offsets corresponding to each frequency have been calibrated. When the last channel has been calibrated, the system may then reconfigure into the second state. A specific example may be if the frequency hopping pattern were [f1, f2, f3, f1, f2, f3, f1, . . . ]. In this case, the system would be in the first state while the system is receiving the first three frequencies (i.e., after the first occurrence of f1, f2, and f3), and the system may reconfigure after the first pattern cycle (here, after the third symbol). If the pattern were [f1, f1, f2, f2, f3, f3, f1, . . . ], for example, the system may reconfigure after the fifth symbol (i.e., after the first occurrence of f3 has been calibrated).

In another embodiment, each channel may reconfigure after a predetermined time period of each symbol when the DC calibration voltage for that symbol frequency has been stored on the capacitor. For example, if the frequency hopping pattern is [f1, f2, f3, f1, f2, f3, f1, . . . ], then during a first portion of the first symbol the circuit will enter a first state to store the DC offset corresponding to the first carrier frequency, f1, on an internal capacitance, and during a second portion of the first symbol the circuit will enter a second state with a lower cutoff frequency to allow subcarriers to pass unattenuated. Then, during a first portion of the second symbol the circuit will enter a first state to store the DC offset corresponding to the second carrier frequency, f2, on an internal capacitance, and during a second portion of the second symbol the circuit will enter a second state with a lower cutoff frequency to allow subcarriers to pass unattenuated. During a first portion of the third symbol the circuit will enter a first state to store the DC offset corresponding to the third carrier frequency, f3, on an internal capacitance, and during a second portion of the third symbol the circuit will enter a second state with a lower cutoff frequency to allow subcarriers to pass. It can be seen that other hopping patterns may be used. For example, if the hopping pattern is [f1, f1, f2, f2, f3, f3, f1, f1, f2, . . . ], then the system will store DC offsets on the first, third and fifth symbols.

More generally, the system will store a DC offset for a first portion of each input signal at each carrier frequency and apply the stored DC offset to subsequent uses of that carrier frequency. It is to be understood that other implementations may use other similar techniques to store DC offsets and change cutoff frequencies between different portions of input signals in accordance with different requirements of particular applications. In addition to the other features and advantages described above, this technique is also advantageous because the lower cutoff frequency in the second state (e.g., 1 Mhz) will automatically eliminate any low frequency phenomena effecting DC offset with a frequency below such cutoff frequency.

Figure 13:
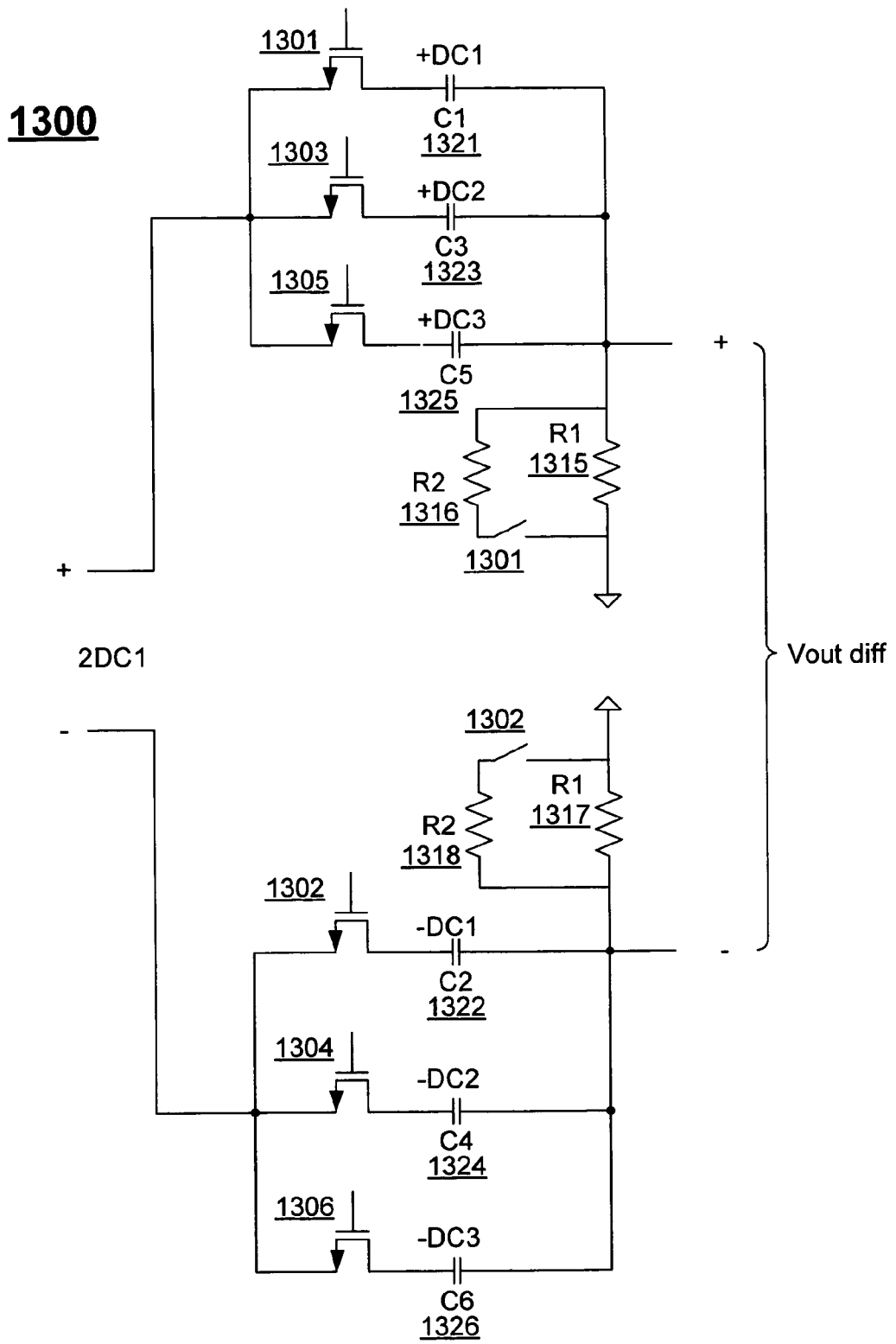
FIG. 13 is an example of a differential implementation of a three stage DC offset cancellation circuit according to one embodiment of the present invention.

FIG. 13 is an example of a differential implementation of a three stage DC offset cancellation circuit 1300 according to one embodiment of the present invention. Circuit 1300 includes three parallel stages for removing DC offset generated, for example, as a result of using three different LO frequencies to down convert three different carrier frequencies. The first stage includes transistor 1301 acting as a switch and capacitor 1321 ("C1") on the positive side and transistor 1302 and capacitor 1322 ("C2") on the negative side. Capacitor C1 is coupled to ground through resistor 1315 ("R1"). A second resistor 1316 ("R2") may be configured in parallel with R1 to reduce the time for a DC offset to be stored on C1. Capacitor C2 is similarly coupled to ground through resistor 1317, which is designated "R1" so that the circuit is symmetric. A second resistor 1318 ("R2") may be configured in parallel with resistor 1317 to reduce the time for a DC offset to be stored on C2. In a first state, switches 1301 and 1302 are closed and the circuit stores DC offset on C1 and C2 (i.e., +DC1 and −DC1). In a second state, switches 1301 and 1302 may be opened to reduce the low cutoff frequency of the circuit.

Similarly, circuit 1300 includes a second DC offset cancellation stage including transistor switches 1303-1304 and capacitors 1323-1324 ("C3" and "C4") for storing a second DC offset (i.e., +DC2 and −DC2). The third DC offset cancellation stage includes transistor switches 1305-1306 and capacitors 1325-1326 ("C5" and "C6") for storing a third DC offset (i.e., +DC3 and −DC3). Transistors 1301-1306 may be used to selectively couple each DC offset cancellation stage into the signal path and thereby store different DC offsets. Since the voltages on the resistors are allowed to discharge close to ground, signals passing through the capacitors of each stage will undergo a DC shift from +/−DC to ground. The DC offset at the output of circuit 1300, Vout diff, therefore, may be substantially eliminated.

The accuracy of circuit 1300 may be improved by observing that certain factors can affect the DC offset stored on each capacitor. For example, transistor switches 1301 and 1302 will experience different gate-to-source and gate-to-drain voltages. In particular, transistors 1301 and 1302 may have the same gate voltages, but transistor 1301 may have source and drain voltages at +DC1, while transistor 1302 has source and drain voltages at −DC1. Such voltage differences may result in different charge injection as the transistors are turned off and on, which will cause the voltages on capacitors C1 and C2 to change by different amounts, resulting in a net DC offset.

Figure 14A:
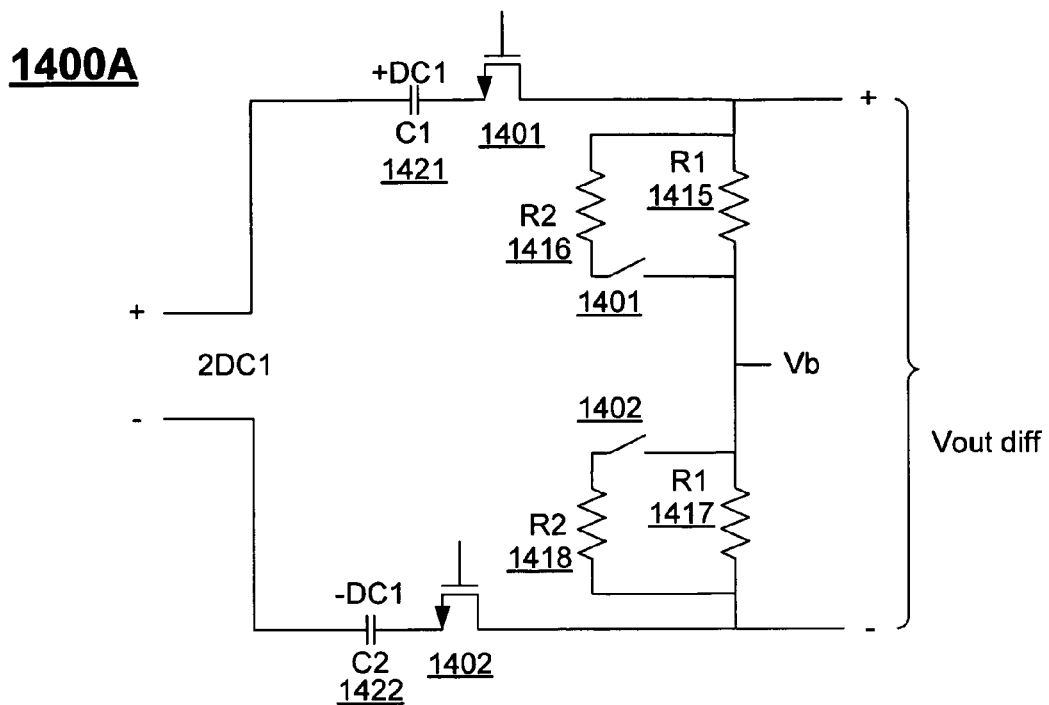
FIG. 14A illustrates a DC offset cancellation circuit according to another embodiment of the present invention.

FIG. 14A illustrates a DC offset cancellation circuit 1400A according to another embodiment of the present invention. According to this embodiment, the switches coupling each DC offset cancellation stage into the signal path (e.g., to the mixer output) are moved to the other side of the capacitors. For example, each stage may be selectively coupled to the mixer output by closing a switch, which couples the output of the DC offset cancellation stage into the signal path, and each stage may be selectively decoupled from the mixer output by opening a switch, which may cause components in the DC offset cancellation circuit to be an open circuit. In FIG. 14A, the input of the circuit is coupled to a first plate of a capacitor, the other plate of the capacitor is coupled to one terminal of a switch (e.g., a source terminal of a transistor), and the other terminal of the switch (e.g., a drain terminal of a transistor) is coupled to the output. Circuit 1400A shows one stage of such a circuit. Capacitors 1421 ("C1") and 1422 ("C2") are coupled to a differential input that may have a DC offset of +/−DC1. The other terminals of capacitors C1 and C2 are coupled to source terminals of transistor switches 1401 and 1402. The drain terminals of transistor switches are coupled to the outputs. In the examples described here and above, wherein the resistors are shared by each DC offset cancellation stage, the drain terminals of transistors 1401 and 1402 are coupled to resistors 1415-1416 and 1417-1418, respectively, which are in turn coupled to a bias voltage Vb (bias voltage Vb is used as a reference voltage for the differential circuit). If each stage used separate resistors, such resistors may be coupled to the source of the switch transistors 1401 and 1402. In circuit 1400A, transistor switches 1401 and 1402 will both discharge close to the bias voltage Vb during a DC offset calibration. Therefore, when the system switches between different DC offset cancellation stages, the source and drain terminals of both transistors 1401 and 1402 should be very close to the bias voltage Vb, which is AC ground. Since both transistors will have approximately the same source and drain voltages with respect to ground, the charge injection introduced by both devices will be about the same, and the DC offset resulting from charge injection will be reduced.

Charge injection effects may be further reduced by addressing two other phenomena. First, device and component mismatch may be a further cause of DC offset. For instance, if switches 1401 and 1402 in circuit 1400A are mismatched, they may inject different amounts of charge. Moreover, the charge injected by such devices may produce different voltages if the capacitors and resistors (e.g., R1, R2, C1 and C2) are also mismatched. Such mismatch may be caused by device or component dimension variations during fabrication, for example. The DC offsets generated by these mismatches may be exacerbated by the input capacitances on the next stage of the system.

Figure 14B:
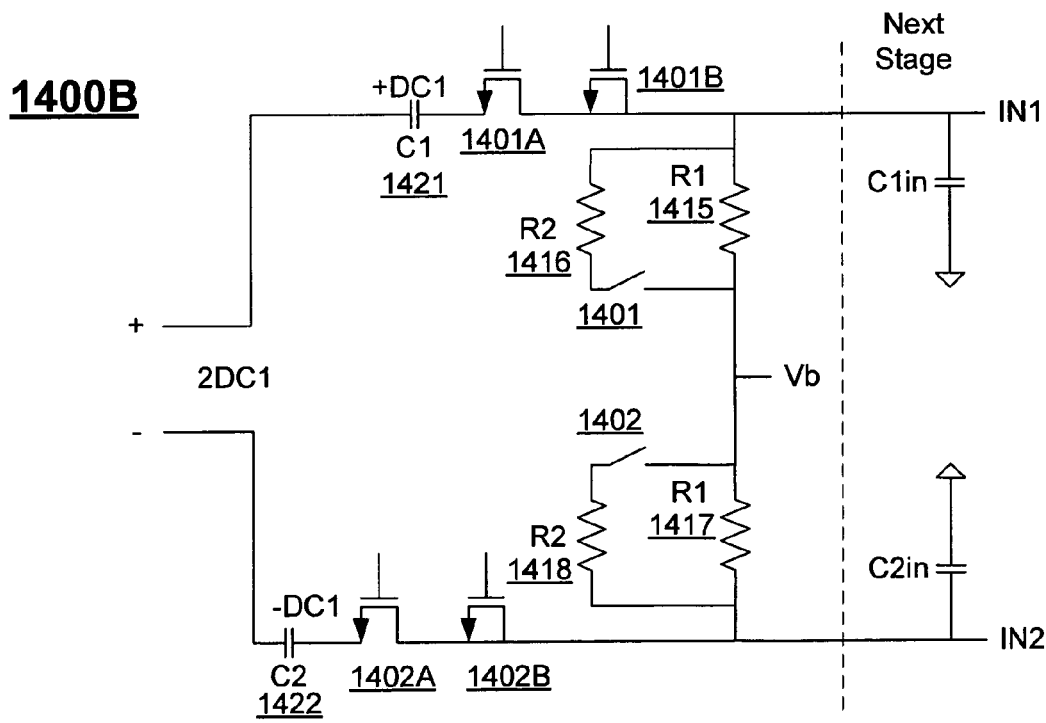
FIGS. 14B-D illustrate a DC offset cancellation circuit according to another embodiment of the present invention.
Figure 14C:
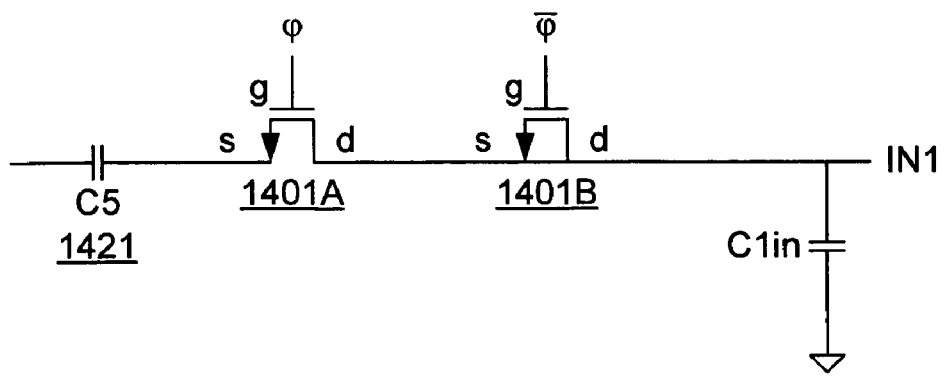
Figure 14D:
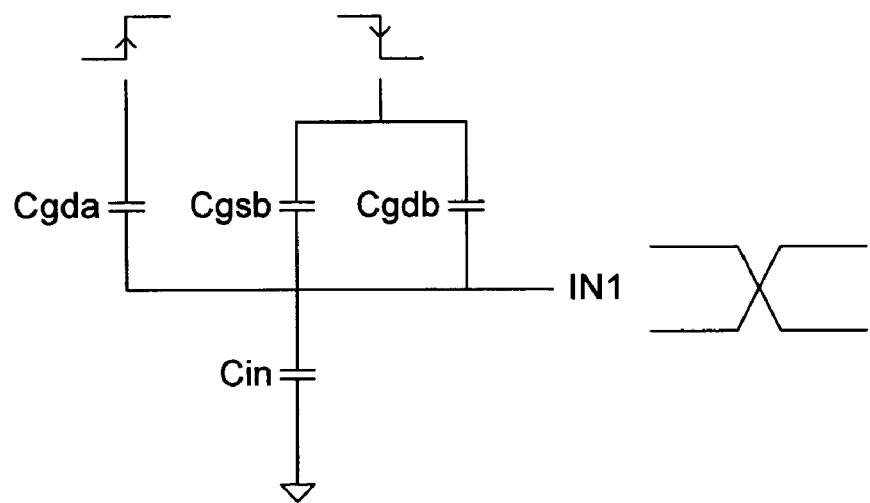

FIGS. 14B-D illustrate a DC offset cancellation circuit 1400B according to another embodiment of the present invention. Circuit 1400B includes switches 1401A and 1402A and dummy devices 1401B and 1402B. Dummy devices 1401-1402B may have one-half (½) the capacitance of switch transistors 1401-1402A (e.g., W/L of the dummy device is about ½(W/L) of the switch transistor). As shown in FIG. 14C, the source and drain terminals of the mismatch devices 1401B and 1402B are coupled together. Switch device 1401A only injects about one-half of its charge into the output of the circuit (i.e., the input "IN1" of the next stage). Since dummy device 1401B is one-half the size of device 1401A, and since dummy device 1401B injects all of its charge into the output node (i.e., because the source and drain of the dummy device are coupled together), charge injection of the devices 1401A and 1401B may be cancelled by turning off the dummy device when the switch device is turned on and turning on the dummy device when the switch device is turned off. As shown in FIG. 14C, the switch device 1401A is controlled by a signal "ϕ" and dummy device 1401B may be controlled by a signal "$\bar{\phi}$", which is the complementary signal to "ϕ". FIG. 14D illustrates that dummy device 1401B also reduces switching feedthrough (sometimes referred to as clock feedthrough). As the voltage on the gate of device 1401A increases (i.e., as a voltage is applied across the gate-to-drain capacitance "Cgda" of device 1401A), the voltage on the output node (i.e., the input of the next stage, IN1) will increase by the capacitive divider created by Cgda and Cin, where Cin is the input capacitance of the next stage (e.g., C1in and C2in of FIG. 14B, which are typically about the same value). However, by applying a complementary signal to the gate of the dummy device 1401B, which is coupled to the output node through both gate-to-drain capacitor Cgdb and gate-to-source capacitor Cgsb, the effects of the capacitive divider may be cancelled out. For example, as mentioned above, device 1401B is one-half the size of device 1401A. Therefore, the capacitances are related as follows:

$$Cgda = Cgsb + Cgdb$$

Accordingly, the increase in voltage caused by capacitive divider Cgda and Cin is cancelled by the decrease in voltage caused by capacitive divider (Cgsb∥Cgdb) and Cin. Thus, using the techniques described above, the effects of charge injection and switching feedthrough may be reduced.

Figure 15:
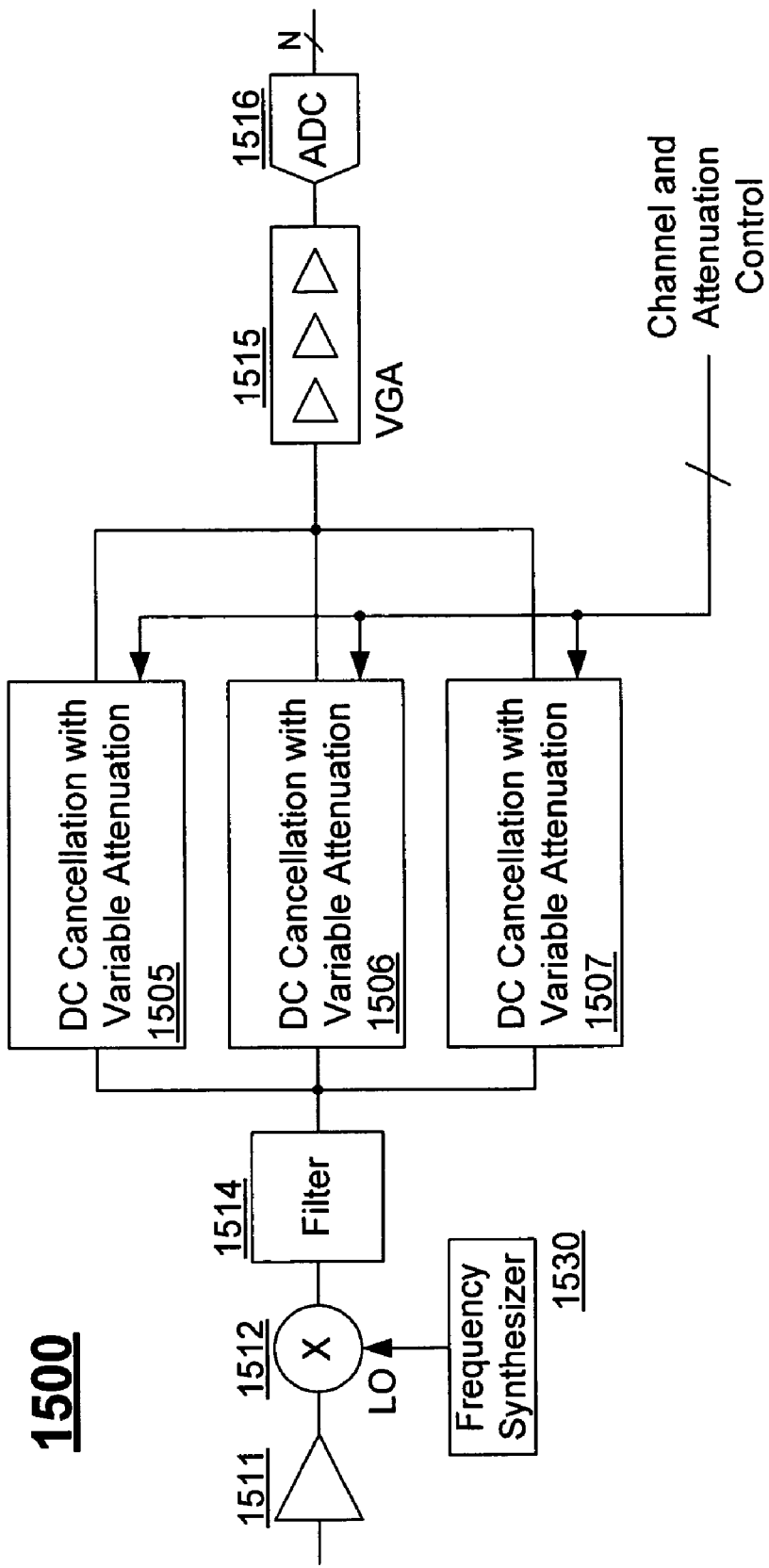
FIG. 15 illustrates another embodiment of the present invention.

FIG. 15 illustrates another embodiment of the present invention. In many applications it may be desirable to control the amplitude of a signal in addition to removing DC offset. The present invention advantageously calibrates the DC offset before modifying the amplitude so that any such changes in the amplitude will be free of DC offset. Accordingly, the DC offset will not change as the amplitude of the signal is changed. Additionally, it may be desirable to tune the amplitude of the signal before the VGA (or PGA) so that the performance of the VGA (or PGA) is optimized. Offset cancellation circuits according to some embodiments of the present invention may include DC offset cancellation stages with variable attenuation. Each DC offset cancellation stage may include a high pass filter with variable attenuation, for example. In this example, the DC offset cancellation circuit includes three stages with variable attenuation 1505-1507 arranged in parallel so that DC offset may be reduced for different LO frequencies and the attenuation of the AC signal may be controlled. Stages 1505-1507 are coupled to the input of VGA 1515. Attenuation may be controlled by control signals received from a channel and attenuation control circuit (not shown). Variable attenuation may allow the system to control the strength of the signal applied to the input of the VGA so that the amplification by VGA 1515 is optimized for the range of ADC 1516.

Figure 16:
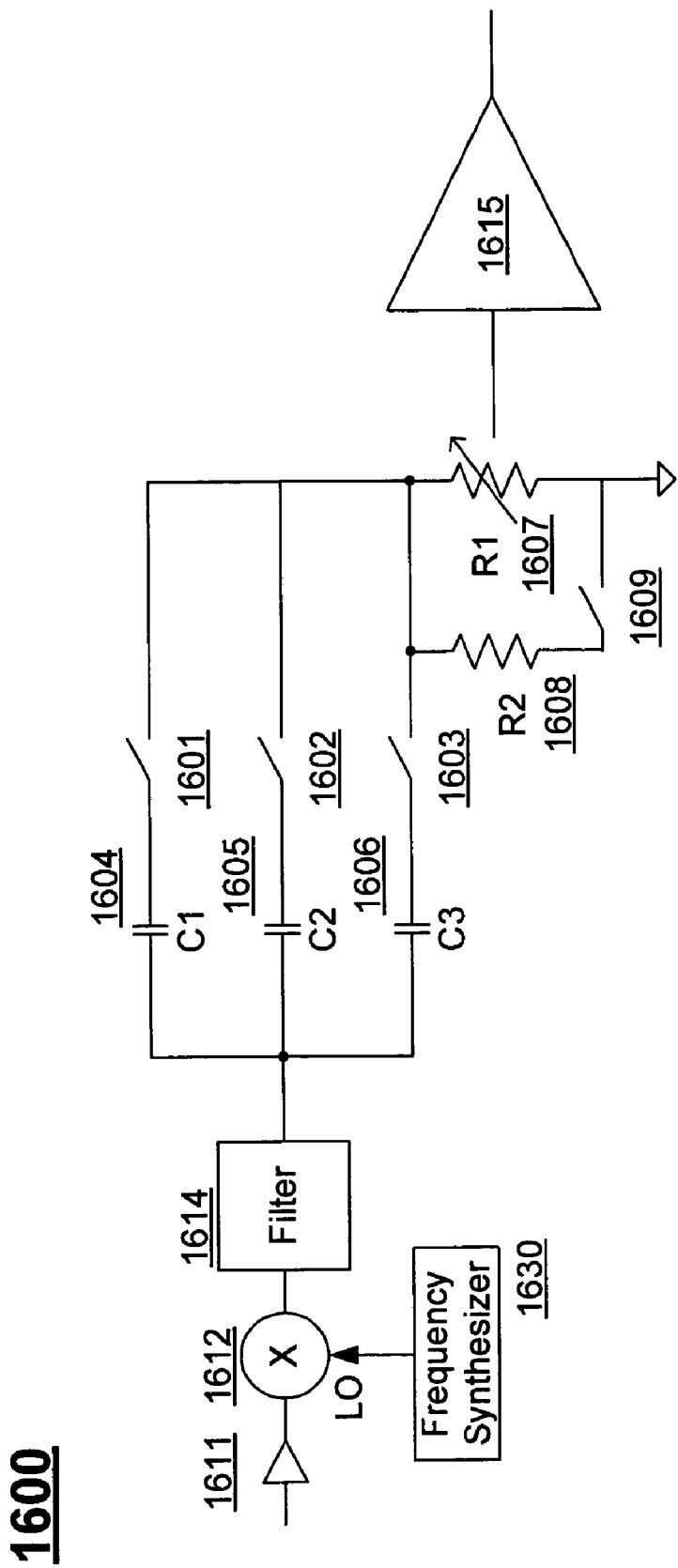
FIG. 16 is an example implementation of DC offset cancellation stages with variable attenuation according to another embodiment of the present invention.

FIG. 16 is an example implementation of DC offset cancellation stages with variable attenuation according to another embodiment of the present invention. The output of mixer 1612 is coupled through filter 1614 to a three stage DC offset cancellation circuit for removing DC offset associated with three different LO frequencies. The DC offset cancellation circuit includes three capacitors ("C1, C2, C3") 1604-1606 that are coupled through switches 1601-1603, respectively, and a resistance to ground. In this case, the resistance includes a variable attenuator ("R1") 1607 and a second resistor ("R2") 1608. Resistor R2 may be switched in parallel with attenuator R1 using switch 1609 to reduce the time constant of each stage during a DC offset calibration cycle. Thus, switches 1601-1603 and switch 1609 may be used to selectively store three DC offsets corresponding to three different LO frequencies on capacitors C1-C3. Variable attenuator 1607 may receive control signals (not shown), such as digital signals, for opening and closing switches for changing the attenuation of the circuit. In one embodiment, the variable attenuator may use the techniques disclosed in commonly-owned concurrently filed U.S. Pat. No.7,304,550, entitled WIDEBAND ATTENUATOR CIRCUITS AND METHODS, naming Edris Rostami, Rahim Bagheri, and Masoud Djafari as inventors, the entire disclosure of which is hereby incorporated herein by reference. The output is provided to an amplifier 1615, which may be the first stage of a VGA, for example. As illustrated previously, the present invention may be implemented as a differential circuit.

Figure 17:
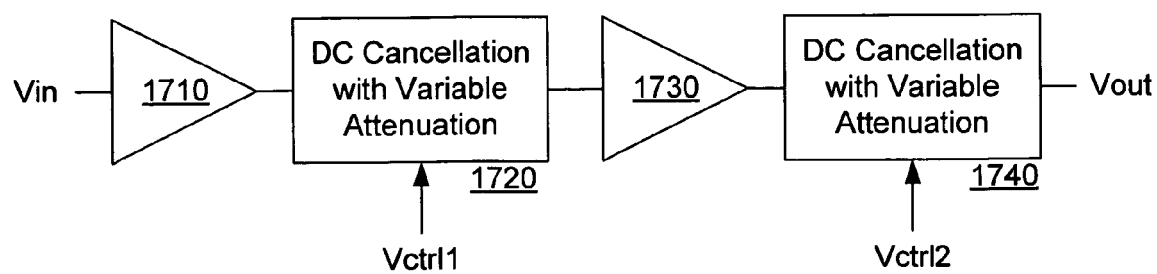
FIG. 17 illustrates part of a variable gain amplifier circuit according to one embodiment of the present invention.

FIG. 17 illustrates a variable gain amplifier circuit ("VGA") 1700 according to one embodiment of the present invention. VGA 1700 may be a programmable gain amplifier ("PGA") that receives digital signals for changing the total gain of the circuit in incremental steps. VGA 1700 receives an input signal in a first amplification stage 1710. The amplified output is received by a first DC offset cancellation and variable attenuation circuit 1720. The second stage of VGA 1700 receives the output of circuit 1720 and includes amplifier 1730 and a second DC offset cancellation and variable attenuation circuit 1740. In one embodiment, amplifiers 1710 and 1730 are fixed gain amplifiers, and the total gain of the VGA is controlled by changing the attenuation of variable attenuators in circuits 1720 and 1740 using control signal included in Vctrl1 and Vctrl2. Moreover, in some embodiments, circuits 1720 and 1740 may receive control signals Vctrl1 and Vctrl2, respectively, to reconfigure each circuit into two different states. In a first state, each circuit has a lower time constant for storing DC offset on an internal capacitance in a shorter amount of time. In a second state, each circuit has a lower cutoff frequency for passing all frequencies of interest. In one embodiment, the present invention advantageously calibrates the DC offset before modifying the amplitude. For example, each stage of the VGA may include a fixed gain amplifier, a DC offset calibration circuit and a variable attenuator coupled in series. Amplification and DC offset calibration are placed before the variable attenuator so that any such changes in the amplitude will not DC offset. Thus, the DC offset correction will not be affected by gain variations, as might be the case if the gain adjustment were before the DC calibration.

Figure 18A:
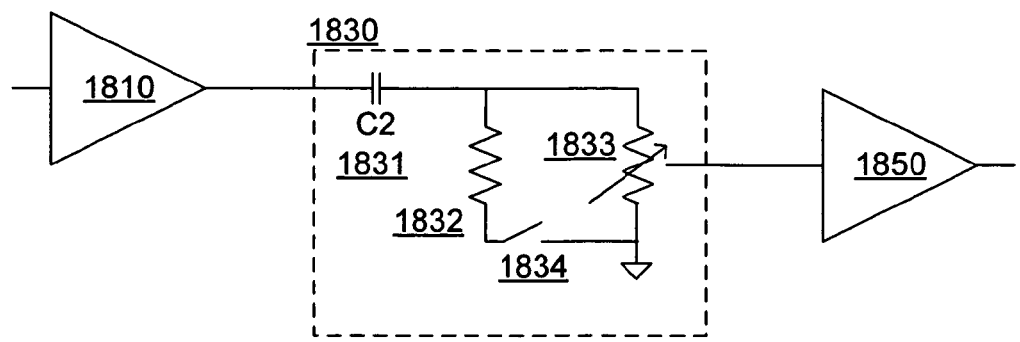
FIG. 18A illustrates part of a VGA with a DC offset cancellation circuit according to one embodiment of the present invention.

FIG. 18A illustrates part of a VGA 1800A with a DC offset cancellation circuit 1830 according to one embodiment of the present invention. VGA 1800A receives input signals in amplifier 1810 and couples the amplified signals to DC offset cancellation circuit 1830. Amplifier 1810 may introduce DC offset, and may further amplify any DC offset received at it's input from prior circuitry. DC offset correction circuit 1830 includes a capacitor ("C2") 1831 for storing DC offset from amplifier 1810. Capacitor C2 is coupled through a resistor 1833 to ground. Resistor 1833 may be a variable attenuator, for example. In some embodiments, such as during the reception of symbols described above, DC offset calibration may need to occur over a short time period. Thus, DC offset calibration circuit 1830 includes a second resistor 1832 that may be configured in parallel with resistor 1833 by closing switch 1834, for example. When resistors 1832 and 1833 are in parallel, the RC time constant of the circuit is reduced (i.e., the low cutoff frequency is increased), and the time it takes for capacitor C2 to discharge to ground is reduced. Switch 1834 may then be opened to reconfigure the circuit to have a lower cutoff frequency so all frequencies of interest may pass. In one embodiment, resistor 1833 may be a variable attenuator. For example, resistor 1833 may be a wideband attenuator using techniques disclosed in commonly-owned concurrently filed U.S. Pat. No. 7,304,550, entitled WIDEBAND ATTENUATOR CIRCUITS AND METHODS, naming Edris Rostami, Rahim Bagheri, and Masoud Djafari as inventors, the entire disclosure of which was incorporated herein by reference above.

While the circuit in FIG. 18A may be useful in many applications, there is one phenomenon that may impact system performance. When switch 1834 is closed, a resistor divider will be created with the output impedance, rout, of amplifier 1810 and resistors 1832-1833. This resistor divider will cause a variation in the gain. In some applications, the circuit of FIG. 18A is limited because it may be desirable to have the low cutoff frequency greater than the low cutoff frequency of previous stages. The resistor values are set by the desired low cutoff frequency and the input capacitance of the subsequent amplifier 1850, and the value of C2 is set by the low cutoff frequency during normal operation. To switch between 1 MHz and 25 MHz, for example, resistor 1832 should be about 25 times smaller than resistor 1833. It would be desirable to add more degrees of freedom to compensate for gain variation.

Figure 18B:
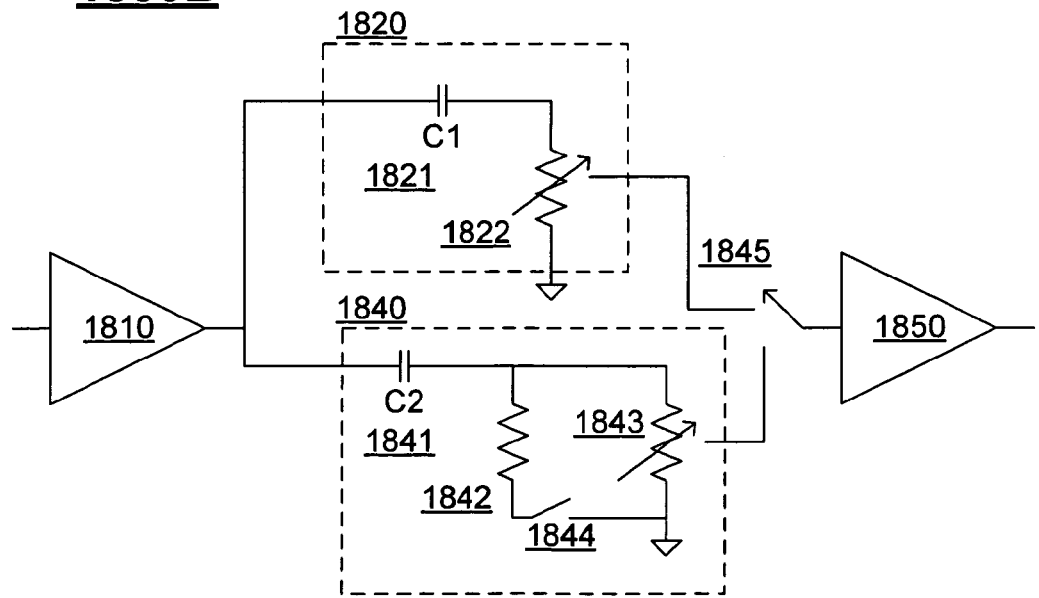
FIG. 18B illustrates part of a VGA with a DC offset cancellation circuit according to another embodiment of the present invention.

FIG. 18B illustrates part of a VGA with a DC offset cancellation circuit according to another embodiment of the present invention. As described above, one problem with circuit 1800A is that the output impedance of amplifier 1810, together with resistors 1832 and 1833 may cause changes in the gain of the circuit when the DC offset cancellation circuit changes from a DC offset calibration state into a normal operation state (e.g., by opening switch 1834). Large gain variation may be unacceptable in some systems. Therefore, DC offset cancellation circuit 1800B includes an amplifier 1810 coupled to a second stage amplifier 1850 through two parallel signal paths. In a first state (e.g., a DC calibration state), switch 1845 couples the input of amplifier 1850 to a first DC cancellation stage 1820 having higher cutoff frequency than a second parallel DC cancellation stage 1840. Stage 1820 includes a capacitor ("C1") 1821 and resistor 1822. The components of stage 1820 are selected to have a low RC time constant (i.e., high corner frequency) for storing a DC offset on capacitor 1821 in a short amount of time. Capacitor 1821 and resistor 1822 are also selected so that the cutoff frequency is still low enough to pass frequencies of interest. Thus, during a DC offset calibration, stage 1820 stores the DC offset on capacitor 1821.

In a normal operating state, switch 1845 is reconfigured to couple the input of amplifier 1850 to stage 1840 having a lower cutoff frequency than stage 1820. Stage 1840 also includes a capacitor ("C2") and resistor 1843. However, the cutoff frequency of stage 1840 is lower than the cutoff frequency of stage 1820 so that all frequencies of interest may pass during normal operation. However, the DC offset correction voltage must be stored on this stage as well. Since this stage has a lower cutoff frequency, the RC time constant set by capacitor 1841 and resistor 1843 will not allow the DC offset to be stored on capacitor C2 during the DC calibration state. Thus, during DC calibration, stage 1840 will be configured into a high cutoff frequency state by closing switch 1844 so that the time constant of the circuit is reduced and the DC offset may be stored on C2. Once the DC offset is stored on capacitors C1 and C2, switch 1844 is opened and switch 1845 is reconfigured so that signal passes through low cutoff frequency stage 1840.

By using two stages in parallel there is a wider range of choices for the values of R and C in each signal path. For example, because stage 1820 is not switching cutoff frequencies, resistance 1822 may be less than resistance 1833 (i.e., resistance 1822 is reduced) and capacitance 1821 may be reduced. Reducing resistance 1822 results in an increase in effective upper bandwidth of this stage when coupled to the input capacitance of subsequent stages. Capacitance 1821 may also be reduced so that the effects of a capacitive divider created by capacitance 1821 and the parasitic input capacitance of switch 1845 and amplifier 1850 can be reduced. Similarly, because no signal is passing through stage 1840, a larger resistor value may be used for resistor 1842 (i.e., a lower cutoff frequency). For example, in one embodiment resistors 1822 and 1843 may be about the same size and resistor 1842 may be about one-tenth the value of resistor 1843. Thus, the effects of the resistor divider created with the output impedance of amplifier 1810 will be reduced.

Figure 19:
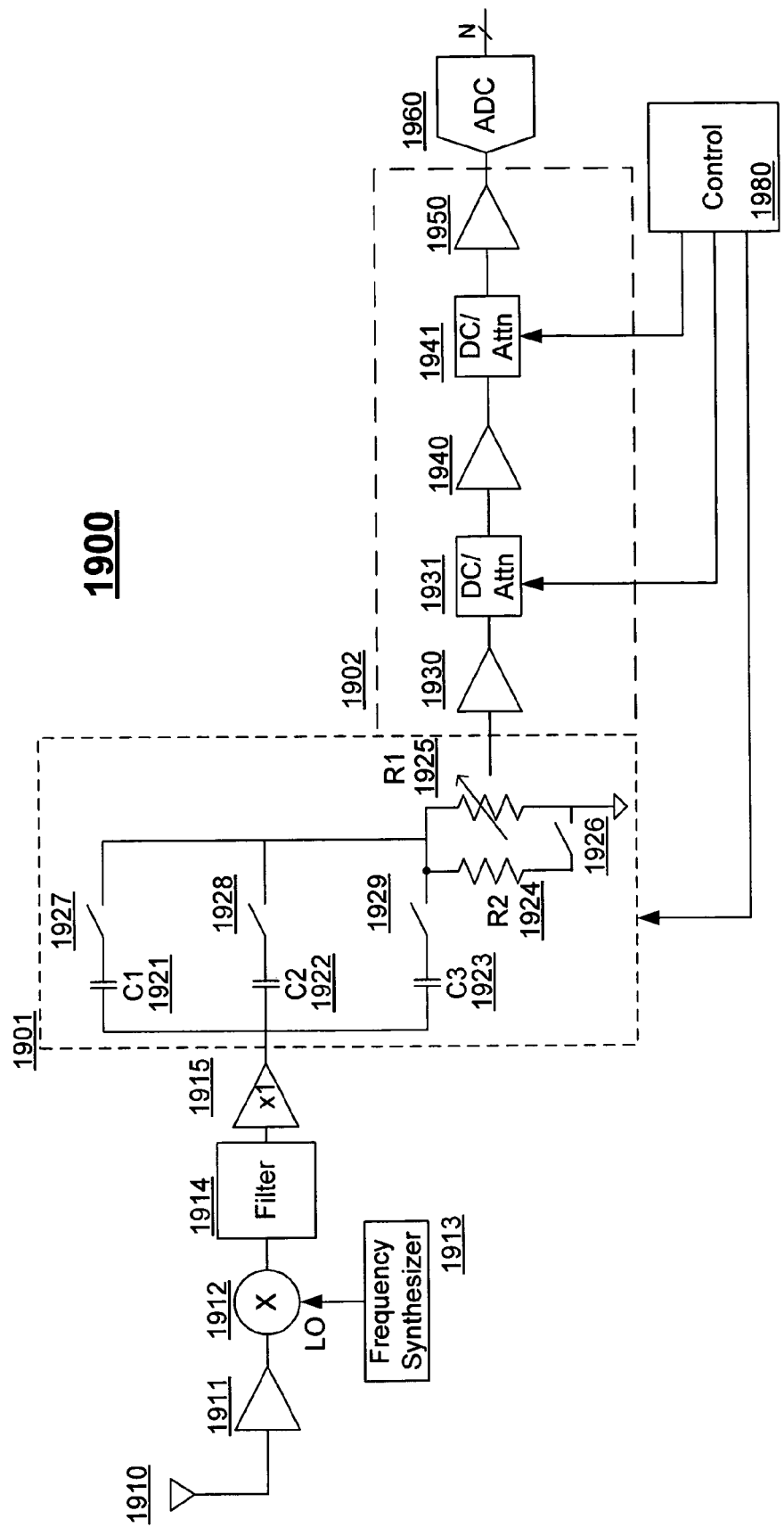
FIG. 19 illustrates wireless receiver with DC offset cancellation according to another embodiment of the present invention.

FIG. 19 illustrates wireless receiver with DC offset cancellation according to another embodiment of the present invention. Wireless receiver 1900 combines the techniques described above to achieve reduced DC offset. Wireless receiver 1900 includes an antenna 1910 for receiving RF signals, an LNA 1911 for amplifying the RF signals, a mixer 1912 for down converting the RF signals. Mixer 1912 includes a first input coupled to the output of LNA 1911 for receiving the RF signal to be down converted and a second input coupled to an LO signal. If the system changes channel (i.e., the carrier frequency of the RF signal changes), the LO signal may also change. In one embodiment, the LO frequencies may hop between from about 3 Ghz to about 9 Ghz in about 500 Mhz intervals so that the receiver can down convert RF signals in a number of different frequencies. In one specific example, RF signals may hop between three different frequencies in one of four band groups. Signals received in the first band group may hop between about 3.5 Ghz, 4 Ghz and 4.5 Ghz, signals received in the second band group may hop between about 5 Ghz, 5.5 Ghz and 6 Ghz, signals received in the third band group may hop between about 6.5 Ghz, 7 Ghz and 7.5 Ghz and signals received in the fourth band group may hop between about 8 Ghz, 8.5 Ghz and 9 Ghz. Within each band group, the frequencies may hop in a variety of hopping patterns.

The output of mixer 1920 is coupled through a filter 1914 and buffer 1915 to the input of a DC offset cancellation circuit 1901. The output of buffer 1920 is coupled to three parallel DC offset cancellation stages, which in this example include capacitors 1921-1923 that each have one terminal coupled to the output of buffer 1920 and a second terminal coupled to three switches 1927-1929. Switches 1927-1929 may also include dummy devices (not shown) for reducing charge injection effects. Switches 1927-1929 are coupled to variable attenuator ("R1") 1925 and resistor ("R2") 1924. DC offset cancellation circuit 1901 may receive control signals from a control circuit 1980 for reconfiguring the circuit between states and controlling the attenuation in variable attenuator 1925. For example, control circuit 1980 may transmit control signals to close switches 1927 and 1926 during a first time period of an input signal received on a first carrier frequency (e.g., during a first portion of an incoming symbol) so that the DC offset associated with the LO signal used to down convert the RF input is stored on capacitor C1. Similarly, control circuit 1980 may reconfigure the circuit by opening switch 1926 during a second time period of the input signal so that the cutoff frequency is reduced and more frequencies may pass. When the LO changes frequency, control circuit 1980 may generate control signals for changing between stages (e.g., opening switch 1927 and closing either switch 1928 or switch 1929). If filter 1914 causes transients or ringing at its output, the switches 1927-1928 may be opened for a predetermined time interval so that such ringing does not corrupt the stored DC calibration values on the capacitors.

The output of DC offset cancellation circuit 1901 is coupled to the input of VGA 1902. VGA 1902 includes a first fixed gain amplifier 1930, a first DC offset cancellation circuit and attenuator 1931, a second fixed gain amplifier 1940, a second DC offset cancellation circuit and attenuator 1941 and a final fixed gain amplifier 1950. The DC offset cancellation circuits 1931 and 1941 include internal capacitances for storing DC offsets from amplifiers 1930 and 1940, respectively. DC offset cancellation circuit and attenuators 1931 and 1941 may receive control signals from control circuit 1980 for reconfiguring the circuits between states and controlling the attenuation of the variable attenuators. For example, control circuit 1980 may transmit control signals to lower the time constant of each circuits during a first time period that an input signal received (e.g., during a first portion of the first incoming symbol) so that the DC offset associated amplifier 1930 is reduced. Similarly, control circuit 1980 may reconfigure the circuit and lower the cutoff frequency during a second time period so that more frequencies may pass. Control circuit 1980 may also provide control signals for selecting between first and second signals paths, wherein a first signal path has a low time constant and a second signal path has a low cutoff frequency. Control circuit 1980 may also provide control signals to control the attenuation of each attenuator. In one embodiment, each of the attenuators may use techniques disclosed in commonly-owned concurrently filed U.S. Pat. No. 7,304,550, entitled WIDEBAND ATTENUATOR CIRCUITS AND METHODS, naming Edris Rostami, Rahim Bagheri, and Masoud Djafari as inventors, the entire disclosure of which was incorporated herein by reference above.

In this example, DC offset cancellation circuits in VGA 1902 are used in conjunction with DC cancellation circuit 1901 between the filter and VGA. In one embodiment, the stages of DC offset cancellation circuit 1901 have cutoff frequencies that are less than the cutoff frequency of the DC offset cancellation circuits in the VGA so that the VGA circuits can track the signals from the previous stages during a DC calibration. For example, in one embodiment, the DC offset cancellation circuits in the VGA have a low cutoff frequency about twice the cutoff frequency of the upstream DC offset cancellation stages. In particular, if the low cutoff frequency of each DC offset cancellation stage may be 15 Mhz, the low cutoff frequency of the DC offset cancellation circuits in the VGA may be 30 Mhz, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A wireless receiver comprising:
a mixer having a first input, a second input and an output, wherein the first input is coupled to a first amplifier to receive an amplified RF signal and the second input is coupled to a frequency synthesizer to receive a first signal having one of a plurality of frequencies; and
a plurality of parallel DC offset cancellation stages selectively coupled to the mixer output,
wherein if the first signal has a first frequency, then a first one of the plurality of parallel DC offset cancellation stages is coupled to the mixer output, and if the first signal has a second frequency, then a second one of the plurality of parallel DC offset cancellation stages is coupled to the mixer output,
wherein, in a first state, at least one of the DC offset cancellation stages has a first low cutoff frequency and, in a second state, the at least one DC offset cancellation stage has a second low cutoff frequency less than the first low cutoff frequency,
wherein each of the plurality of stages is coupled to a first resistance in the first state, and each of the plurality of stages is coupled to a second resistance greater than the first resistance in the second state.

2. The wireless receiver of claim 1 wherein each of the plurality of DC offset cancellation stages includes a switch and a capacitor.

3. A wireless receiver comprising:
a mixer having a first input, a second input and an output, wherein the first input is coupled to a first amplifier to receive an amplified RF signal and the second input is coupled to a frequency synthesizer to receive a first signal having one of a plurality of frequencies; and
a plurality of parallel DC offset cancellation stages selectively coupled to the mixer output,
wherein if the first signal has a first frequency, then a first one of the plurality of parallel DC offset cancellation stages is coupled to the mixer output, and if the first signal has a second frequency, then a second one of the plurality of parallel DC offset cancellation stages is coupled to the mixer output,
wherein each of the plurality of DC offset cancellation stages includes a first resistor coupled to a reference voltage through a switch.

4. A wireless receiver comprising:
a mixer having a first input, a second input and an output, wherein the first input is coupled to a first amplifier to receive an amplified RF signal and the second input is coupled to a frequency synthesizer to receive a first signal having one of a plurality of frequencies; and
a plurality of parallel DC offset cancellation stages selectively coupled to the mixer output,
wherein if the first signal has a first frequency, then a first one of the plurality of parallel DC offset cancellation stages is coupled to the mixer output, and if the first signal has a second frequency, then a second one of the plurality of parallel DC offset cancellation stages is coupled to the mixer output,
wherein each of the plurality of DC offset cancellation stages includes a variable attenuator.

5. A wireless receiver comprising:
a mixer having a first input, a second input and an output, wherein the first input is coupled to a first amplifier to receive an amplified RF signal and the second input is coupled to a frequency synthesizer to receive a first signal having one of a plurality of frequencies;
a plurality of parallel DC offset cancellation stages selectively coupled to the mixer output;
a second amplifier having an input coupled to an output of each of the plurality of parallel DC offset cancellation stages; and
a third DC offset cancellation stage coupled to an output of the second amplifier,
wherein if the first signal has a first frequency, then a first one of the plurality of parallel DC offset cancellation stages is coupled to the mixer output, and if the first signal has a second frequency, then a second one of the plurality of parallel DC offset cancellation stages is coupled to the mixer output,
wherein, in a first state, the third DC offset cancellation stage has a first low cutoff frequency and, in a second state, the third DC offset cancellation stage has a second low cutoff frequency less than the first low cutoff frequency.

6. The wireless receiver of claim 5 further comprising a fourth DC offset cancellation stage coupled in parallel with the third DC offset cancellation stage.

7. The wireless receiver of claim 5 further comprising a variable attenuator coupled to an output of the third DC offset cancellation stage.

8. The wireless receiver of claim 5 wherein the DC offset cancellation stages comprise high pass filters.

9. A wireless receiver comprising:
a first DC offset cancellation circuit, wherein in a first state, the first DC offset cancellation circuit has a first low cutoff frequency, and in a second state, the first DC offset cancellation circuit has a second low cutoff frequency less than the first low cutoff frequency,
wherein the first DC offset cancellation circuit is coupled between a mixer and a variable gain amplifier, and wherein the variable gain amplifier includes at least one second DC offset cancellation circuit, wherein in the first state, the second DC offset cancellation circuit has a third low cutoff frequency greater than the first low cutoff frequency of the first DC offset cancellation circuit, and in the second state, the second DC offset cancellation circuit has a fourth low cutoff frequency less than the third low cutoff frequency.

10. A wireless receiver comprising a first DC offset cancellation circuit, wherein in a first state, the first DC offset cancellation circuit has a first low cutoff frequency, and in a second state, the first DC offset cancellation circuit has a second low cutoff frequency less than the first low cutoff frequency, and further comprising a variable gain amplifier comprising a fixed gain amplifier and variable attenuator, wherein the first DC cancellation circuit is coupled between the fixed gain amplifier and the variable attenuator.

11. The wireless receiver of claim 10 wherein the first DC cancellation circuit includes a first and second parallel DC cancellation stages.

12. A wireless receiver including a DC offset cancellation circuit, the DC offset cancellation circuit comprising:
a capacitor having a first terminal coupled to receive an input signal and a second terminal;
a first MOS transistor having a first terminal and a second terminal, the first terminal of the MOS transistor being coupled to the second terminal of the capacitor; and
a resistance coupled between the second terminal of the first MOS transistor and a reference voltage, wherein, in a first state, the resistance has a first value so that the circuit has a first low cutoff frequency, and in a second state, the resistance has a second value so that the circuit has a second low cutoff frequency less than the first low cutoff frequency.

13. The wireless receiver of claim 12 wherein the resistance comprises a first resistor coupled to the second terminal of the first MOS transistor and a second resistor selectively coupled in parallel with the first resistor.

14. The wireless receiver of claim 12 further comprising a second MOS transistor having a source and drain coupled to the second terminal of the first MOS transistor.

15. The wireless receiver of claim 12 wherein the DC offset cancellation circuit is a differential circuit.

16. The wireless receiver of claim 12 wherein the resistance is a variable attenuator.

* * * * *